US008175521B2

(12) United States Patent
O'Neill

(10) Patent No.: US 8,175,521 B2
(45) Date of Patent: *May 8, 2012

(54) REPEATER SYSTEM FOR STRONG SIGNAL ENVIRONMENTS

(75) Inventor: Frank P. O'Neill, Boulder, CO (US)

(73) Assignee: Bandwidth Wireless Limited Liability Company, Wilmington, DE (US)

( * ) Notice: Subject to any disclaimer, the term of this patent is extended or adjusted under 35 U.S.C. 154(b) by 343 days.

This patent is subject to a terminal disclaimer.

(21) Appl. No.: 12/470,590

(22) Filed: May 22, 2009

(65) Prior Publication Data

US 2009/0270027 A1    Oct. 29, 2009

Related U.S. Application Data

(63) Continuation of application No. 11/289,877, filed on Nov. 30, 2005, now Pat. No. 7,555,261, which is a continuation of application No. 10/794,458, filed on Mar. 4, 2004, now Pat. No. 6,993,287.

(60) Provisional application No. 60/451,397, filed on Mar. 4, 2003.

(51) Int. Cl.
*H04B 3/36* (2006.01)

(52) U.S. Cl. ............... 455/7; 455/15; 455/20; 370/315

(58) Field of Classification Search ............... 455/7, 9, 455/10, 11.1, 13.1, 22, 15, 20, 522, 127.1, 455/69, 562.1, 561, 232.1, 240.1, 116; 370/323, 370/330, 315, 318; 330/254
See application file for complete search history.

(56) References Cited

U.S. PATENT DOCUMENTS

| 2,559,613 A | 7/1951 | Halstead |
| 3,028,489 A | 4/1962 | Chasek |
| 4,001,834 A | 1/1977 | Smith |
| 4,317,216 A | 2/1982 | Kaegebein |

(Continued)

FOREIGN PATENT DOCUMENTS

EP    0605182    7/1994

(Continued)

OTHER PUBLICATIONS

F. Sapienza and S. Kim; "Dominant Piolot Recovery in IS-95 CDMA Systems Using Repeaters"; IEICE Trans. Commun., vol. E84-B, No. 1, Jan. 2001; pp. 134-137.

(Continued)

*Primary Examiner* — Lana N Le
*Assistant Examiner* — Golam Sorowar
(74) *Attorney, Agent, or Firm* — Connolly Bove Lodge & Hutz LLP

(57) ABSTRACT

A repeater system combines co-located antennas, an intentional imbalance in signal amplification between downlink and uplink, stability management and an amplification indicator to create a user-installed solution to co-channel interference within cellular systems, in strong signal environments such as elevated locations or high-rise building. The invention may be particularly relevant to cellular systems, such as CDMA, that allow limited imbalance between uplink and downlink path losses, thus enabling the design of an inexpensive repeater with a weaker or non-existent uplink, and which creates moderate signal amplification for selected line-of-sight signals, defeating co-channel interference over a small area. The difference in signal amplification on the downlink and uplink is maintained at a level below the capacity of the system to support imbalance, guaranteeing reliable cellular calls.

19 Claims, 13 Drawing Sheets

Circuit for Interference Repeater

U.S. PATENT DOCUMENTS

| | | | |
|---|---|---|---|
| 4,360,927 A | | 11/1982 | Bowen et al. |
| 4,475,243 A | | 10/1984 | Batlivala et al. |
| 4,652,887 A | * | 3/1987 | Cresswell .................... 343/766 |
| 4,704,733 A | | 11/1987 | Kawano |
| 4,727,590 A | | 2/1988 | Kawano et al. |
| 4,754,495 A | | 6/1988 | Kawano et al. |
| 4,941,200 A | | 7/1990 | Leslie et al. |
| 5,095,528 A | | 3/1992 | Leslie et al. |
| 5,204,970 A | | 4/1993 | Stengel et al. |
| 5,404,570 A | | 4/1995 | Charas et al. |
| 5,457,814 A | | 10/1995 | Myrskog et al. |
| 5,815,795 A | * | 9/1998 | Iwai ................................ 455/9 |
| RE36,076 E | | 2/1999 | Bryant et al. |
| 5,887,261 A | | 3/1999 | Csapo et al. |
| 5,912,641 A | | 6/1999 | Dietrich |
| 5,983,072 A | | 11/1999 | Schroderus |
| 6,009,324 A | | 12/1999 | Pravitz et al. |
| 6,188,872 B1 | | 2/2001 | Nagira et al. |
| 6,282,434 B1 | | 8/2001 | Johannisson et al. |
| 6,336,042 B1 | | 1/2002 | Dawson et al. |
| 6,353,729 B1 | | 3/2002 | Bassirat |
| 6,373,833 B1 | | 4/2002 | Suonvieri et al. |
| 6,381,230 B1 | | 4/2002 | Wheatley, III et al. |
| 6,381,473 B1 | | 4/2002 | Niki |
| 6,400,959 B1 | | 6/2002 | Nagira et al. |
| 6,445,904 B1 | | 9/2002 | Lovinggood et al. |
| 6,459,725 B1 | | 10/2002 | Baker et al. |
| 6,584,081 B1 | | 6/2003 | Lee et al. |
| 6,615,021 B1 | * | 9/2003 | Lovinggood et al. ........ 455/11.1 |
| 6,728,514 B2 | | 4/2004 | Bandeira et al. |
| 6,731,904 B1 | | 5/2004 | Judd |
| 6,745,003 B1 | | 6/2004 | Maca et al. |
| 6,748,212 B2 | | 6/2004 | Schmutz et al. |
| 6,868,254 B2 | | 3/2005 | Weissman |
| 2002/0039885 A1 | * | 4/2002 | Weissman et al. ............... 455/20 |
| 2002/0044594 A1 | | 4/2002 | Bongfeldt |
| 2002/0045431 A1 | | 4/2002 | Bongfeldt |
| 2002/0045461 A1 | | 4/2002 | Bongfeldt |
| 2002/0065094 A1 | * | 5/2002 | Schmutz et al. ............... 455/522 |
| 2002/0093926 A1 | | 7/2002 | Kilfoyle |
| 2002/0123306 A1 | * | 9/2002 | Masoian .......................... 455/7 |
| 2003/0038677 A1 | * | 2/2003 | Teramoto et al. ............. 330/254 |
| 2003/0050099 A1 | * | 3/2003 | Izadpanah ..................... 455/562 |
| 2003/0095070 A1 | * | 5/2003 | O'Connell ............. 343/700 MS |
| 2003/0104781 A1 | * | 6/2003 | Son .................................. 455/22 |
| 2003/0211828 A1 | * | 11/2003 | Dalgleish et al. ............ 455/11.1 |
| 2004/0097189 A1 | | 5/2004 | Bongfeldt et al. |
| 2004/0110469 A1 | | 6/2004 | Judd et al. |
| 2004/0166802 A1 | | 8/2004 | McKay et al. |

FOREIGN PATENT DOCUMENTS

| | | |
|---|---|---|
| JP | 2000-183797 | 6/2000 |
| WO | WO-95/31866 | 11/1995 |
| WO | WO-0117059 | 3/2001 |
| WO | WO-0233996 | 4/2002 |
| WO | WO-03013005 | 2/2003 |
| WO | WO-03013028 | 2/2003 |

OTHER PUBLICATIONS

S. Park, W. Kim and B. Kwon; "An Analysis of Effect of Wireless Network by a Repeater in CDMA System"; 2001; pp. 2781-2785.

Spotwave Wireless White Paper; "Adaptive Repeater Concepts"; Mar. 2003; pp. 1-4.

* cited by examiner

Figure 5: Installation Algorithm

Saturation-Prevention Algorithm with Adaptive Level and Adaptive Period

Figure 10: Cellular System

Circuit and Features of Interference Repeater with a Weaker Uplink

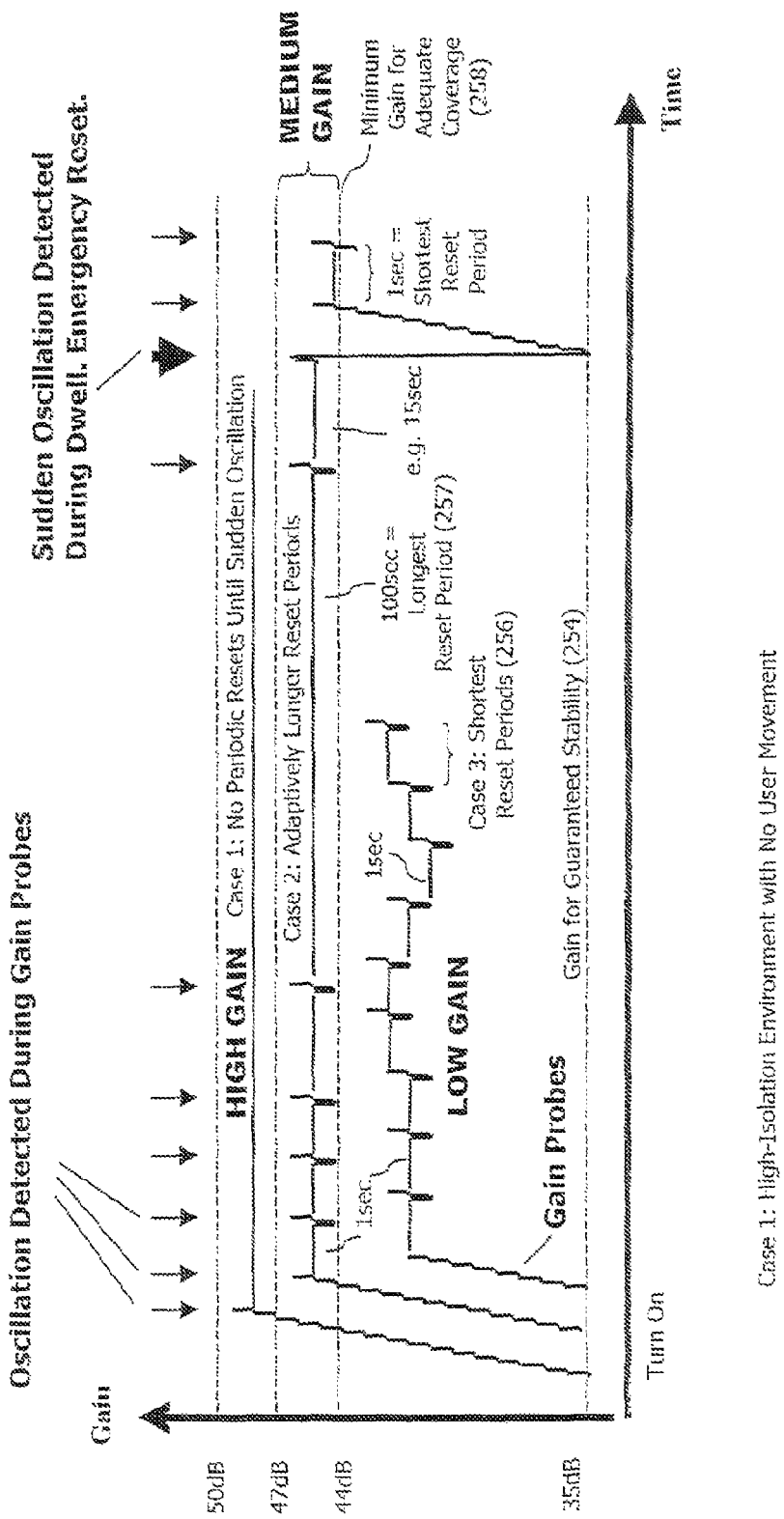

REPEATER SYSTEM FOR STRONG SIGNAL ENVIRONMENTS

CROSS-REFERENCE TO RELATED APPLICATIONS

This application is a continuation application of U.S. patent application Ser. No. 11/289,877, filed Nov. 30, 2005, which is a continuation-in-part of U.S. patent application Ser. No. 10/794,458, filed Mar. 4, 2004, which claims priority from U.S. Provisional Application Ser. No. 60/451,397, filed Mar. 4, 2003, the contents of which are herein incorporated by reference in their entireties.

FIELD

This present invention relates generally to repeater systems for mobile communication systems such as cellular telephone systems, and more particularly to imbalanced repeater systems.

BACKGROUND

As is well known, cellular and PCS systems provide two-way audio and data communications to subscribers, deploying hundreds of cell sites in a typical large city to create coverage over 95% or more of the targeted area. Downlink signals are transmitted to cellular subscriber telephones from directional base station antennas mounted at 30-100 ft above ground level. Uplink signals are received from subscribers by the same directional antennas.

In the United States in 2003, there were 127M subscribers to the cellular service providers available in each urban market. World market size was about 800M in 2003. Subscribers with telephones using CDMA technologies represent 44% of the U.S. market, while subscribers with telephones using TDMA, GSM, and AMPS technologies represent the other 56%.

Power control algorithms in the cellular network establish and vary the uplink power levels to be transmitted from the subscriber unit (cell phone) in order to maintain good call quality and to minimize interference to other calls. Downlink power levels are either static, or are varied to a lesser degree, relying on information from the subscriber unit in order to determine what downlink power levels will give good audio quality. Measurements of uplink signal quality are performed by the base stations and then power control commands are issued to the subscriber units to maintain a minimum or ideal signal quality. Cellular systems are designed for a "balanced link" so that the uplink and downlink cell radii are the same, and so that uplink and downlink handoff boundaries are coincident. Balanced in this sense may mean less than 1 dB of difference between the two directions.

CDMA, or code division multiple access, cellular systems are defined by IS-95, J-Std-008, and the evolving UMTS (Universal Mobile Telephone System) standards. In CDMA systems, subscriber unit transmit power is initially based on the received downlink power, received from a fixed pilot power level that all base stations transmit. The subscriber unit uses its received power, and the knowledge that, on average, the path loss is the same for uplink and downlink (balanced), to calculate an appropriate uplink power to transmit with in order to meet the same signal quality requirement as that used on the downlink. Once call setup has begun, the uplink receiver at the base station takes over subscriber power control by transmitting messages to the subscriber, incrementing power up or down 800 times per second to maintain a target signal quality level. Uplink power control then is substantially independent from the received downlink signal level once call setup begins, and can offset the link balance up to a programmed amount.

Imbalance in path loss between the downlink direction and the uplink direction occurs when a phenomenon known as fast-fading (same as small-scale fading) occurs independently on the uplink and downlink, leading to so called "opposite fading." Fast fades can represent drops in average power, every half-wavelength or so, of 20 dB or more. So, the uplink and downlink can be temporarily offset by 20 dB or more at times. Longer-term imbalance can also occur due to system calibration errors, due to noise rise fluctuations at the base station receiver, and due to variations in diversity antenna gain.

Typical causes of poor call quality include insufficient capacity, weak coverage, and strong interference. Capacity is the ability to handle many calls (e.g., a lack of capacity results in a blocked call). Capacity can be increased by re-using the frequencies allocated to that service provider many times over in a single city. TDMA, GSM, and AMPS systems use seven-cell reuse patterns, meaning adjacent cells use different frequency channels and/or time slots to prevent co-channel interference. CDMA uses a one-cell reuse pattern, meaning every cell uses the same frequency channel all of the time. In this case, talk channels are separated by coding.

Coverage holes sometimes occur in valleys, tunnels, buildings, and in places where there are no nearby base stations. The coverage hole in a building is either the central area of a floor, away from the windows, or the entire floor. Generally, the upper floors of tall buildings in urban areas have very strong signals from several LOS or near-LOS base stations. Under LOS conditions, path loss behaves approximately according to $d^2$ (where d is the one-way distance between the antenna system of the base station and the antenna of the subscriber unit), which means losses increase 4× (or 6 dB) for each doubling of distance between the base station and the subscriber unit. Under LOS conditions, the subscriber can potentially see the base station. Under near-LOS conditions, there may be additional losses, such as those caused by diffraction, which bends the rays coming from the base station as they pass by the edge of an obstruction. In LOS and near-LOS conditions, most of the energy arriving at the subscriber unit occurs within a narrow angular spread from one general direction.

The cellular concept works because of terrestrial propagation, providing isolation between cells using the same frequency (co-channel cells) via manmade clutter, trees, and terrain. For non-LOS signal paths, path loss behaves approximately according to $d^4$, meaning loss increases 16× (or 12 dB) for each doubling of distance between cell site and subscriber unit. As long as a user is on or near ground level, the system will work as planned and provide nearly interference-free performance with predictable handoff boundaries. In urban areas for subscribers on the ground, non-LOS conditions prevail, because of the interceding clutter, and the radio energy is scattered over a nearly 360° angular spread, arriving at the subscriber from many directions at once, summing at the omni-directional antenna.

One problem that occurs in strong-signal locations is co-channel interference. Co-channel interference occurs when the signal received from two or more cell sites using the same frequency are adequate (>−90 dBm) and comparable in signal strength, resulting in poor audio quality or the inability to place or receive a phone call. This may occur, for instance, on the upper floors (e.g., floor 6 and up) of high-rise buildings, such as apartments and offices, because of the breakdown of the terrestrial cellular concept and the occurrence of LOS and near-LOS conditions with several nearby base stations. When a subscriber unit located in such a location "sees" several co-channel cell sites, poor audio quality or "no service" occurs for the user and the spectrum operator experiences a reduction in billable airtime. All technologies experience co-channel interference on uplink and/or downlink. Strong signals in high-rise buildings are typically in the range of −90 dBm to −50 dBm. Because of the strong signal levels, the subscriber unit is well within the uplink and downlink range limits of the cell design.

CDMA is particularly vulnerable to this problem, as is any communications technology that has a small frequency reuse factor. CDMA co-channel interference is called pilot pollution. CDMA is more susceptible to co-channel interference in elevated locations than other technologies because of one-cell reuse factor, instead of the seven-cell reuse used by TDMA, GSM, and AMPS systems. Once as many as four-to-six pilot signals (cells) are received by a subscriber unit at approximately the same signal strength/quality, the telephone cannot lock onto a signal and it may be difficult to impossible to obtain service (calls cannot be placed or received)

Even if service is obtained, the user experiencing pilot pollution may hear a break-up in the audio signal as he/she moves about the room. Since the uplink power control in CDMA has a dynamic range of 80 dB and is managed well, pilot pollution is generally only a problem in the downlink direction. While the presence of an uplink transmission from a subscriber unit in a high-rise building may have an effect on many CDMA base stations, possibly decreasing capacity slightly, the power control algorithms keep all current phone calls equal in received power level so no one call is interfered with. It is estimated that ten to twenty-five percent of windowed rooms located on or above the sixth floor have pilot pollution.

There are several million high-rise office and apartment rooms in the U.S., and interference is usually the strongest nearer the window, where there is LOS visibility to several base stations. Generally, the interference diminishes as the user moves away from the window and the associated outage volume, and into the core of the building. This is because the building acts as a directional antenna, selectively attenuating some of the co-channel signals, resulting in less interference. Often, one side of a building will have the problem and the other side will not. As a result, co-channel interference tends to concentrate in a subset of the windowed rooms within an affected building, and only some individuals will require a solution. In other situations, an entire floor may experience co-channel interference, and there may be several or many residents who want to restore cellular service.

Unfortunately, subscribers cannot distinguish, generally, between an interference problem and a coverage problem. The subscriber just experiences poor audio or no service. As a result, the only options available to subscribers are to complain to their provider and/or change providers (churn). Since there is incomplete feedback to the provider as to the nature of a customer's problem, the provider may have insufficient information to design a customer-specific solution. Twenty million CDMA subscribers are expected to leave (churn) their U.S. provider in 2004 due to coverage, interference, or pricing (based on 127M subs, average churn of 37% per year, and 44% CDMA).

Two-way personal repeaters and two-way higher-power indoor and outdoor repeaters are "coverage repeaters," designed to solve coverage problems due to weak signals in outdoor and indoor locations using balanced amplification of uplink and downlink. Balanced amplification of both links maintains the "balanced link" design, which is important in a weak signal condition since it is desirable to extend both uplink and downlink cell radii equally into the weak signal area. Coverage repeaters are occasionally applied to co-channel interference problems. Coverage repeaters are designed for larger areas, such as partial floors, whole floors, or whole buildings, and are not economical for smaller areas of interference (e.g. an apartment or office room). Furthermore, an indoor coverage repeater installation includes a remotely-mounted (not co-located) highly directional pickoff antenna (e.g. 30° beamwidth), often a Yagi, to pick-off a single base station (known as a donor cell). The pickoff antenna is usually placed at a higher elevation (such as the roof of the building) than the area of weak coverage in order to collect a strong and particular LOS signal, unavailable at the subscriber unit, and must be positioned/adjusted to point at the desired donor cell. The signal gain experienced by the subscriber is as dependent on the signal field at the pickoff antenna as it is on the amplifier gain and the antenna gains. When applying coverage repeaters to interference problems, a remote pickoff antenna is still needed in order to establish the donor signal well above the noise floor and above adjacent spectrum signals prior to amplification so that the indoor re-radiating antenna does not cause interference to other-system subscribers. The installation includes a coaxial run to relay the pickoff signal back to the repeater unit and indoor re-radiating antenna(s). The installation also includes a downlink and uplink amplifier chain and an uplink interference control mechanism, via a control circuit and/or operator coordination/engineering, that sets gain appropriately in order to avoid interference to the larger outdoor system. The installation also includes setting downlink gain, either manually, or automatically, to match uplink gain and avoid oscillation due to excessive antenna-antenna feedback. The installation further includes a re-radiating antenna or a distributed antenna system. Often, a method for monitoring the repeater for malfunction is incorporated in the installation in order to notify the operator of potential interference to same or other communications systems. For example, the occurrence of oscillation in the repeater, occurring at some frequency within the pass band of the filtering circuits, may transmit an interfering signal, at rated power, to one or more base station receivers, or to one or more subscribers. Oscillation within the uplink stages of the repeater may interfere with the performance of donor cells of the system intended to be enhanced by the repeater, or may interfere with the performance of base station receivers belonging to systems not served by the repeater installation. In addition, oscillation within the downlink stages of the repeater may interfere with subscribers that are served by the repeater installation, or with subscribers on adjacent RF channels or in adjacent spectra owned by other communications systems.

Personal (coverage) repeaters are lower power version of standard repeaters, have lower gain (e.g. 50-60 dB), and are designed to serve a single floor or partial floor. Personal repeaters have limited range, however, and if applied to solving pilot pollution in a windowed room, may not extend to the interior or core area of the same high-rise floor.

Coverage repeaters have the following disadvantages: they are costly, they require engineering, they pose a risk to the uplink performance of the same-spectrum and adjacent-spectrum cellular systems, and they are optimized for large areas shared by many subscribers. Personal coverage repeaters are expensive—$500 to $3000—compared to the cost of changing service providers. A weatherproof outdoor antenna, remote mounting, a highly-directional pickoff, controlling the uplink gain (circuit and/or engineering), installing a coaxial run, and system monitoring all add cost to a repeater installation. Coverage repeaters require complex installation because a donor site must be selected and a coaxial cable run and roof/outdoor pickoff antenna mounting is required with a hole through the roof or wall. They run the risk of system interference and require engineering and operator coordination. If oscillation occurs due to changes in the path loss environment, generally a shutback circuit reduces gain or turns the amplifier off, disabling the repeater, which then requires a technician to re-optimize the gain setting or the installation. The solution is not cost effective for an individual experiencing co-channel interference within an office or apartment since coverage repeaters are optimized to solve coverage (weak signal) problems. Many of the elements are intended to address other issues than a high-rise interference problem that may only be experienced by a single user. These elements include a highly-directional antenna, uplink gain, uplink interference control, remote pickoff antenna mounting and the associated coaxial run, and repeater monitoring to protect the system from interference. Lastly, the pickoff signal strength is unpredictable (until a signal measurement is made at the pickoff location), so the gain needed in the user ambient environment is somewhat unknown.

It is important to recognize that mobile telecommunication systems are always designed to be balanced systems, in that the downlink path losses are equal to the uplink path losses. This is done so that the cell boundaries (areas where hand-offs occur) are the same for both the downlink and uplink directions. Furthermore, all repeater systems are designed to preserve or restore balance in or to the mobile telecommunication system. This is so ingrained into designs that there can be said to be a "culture of balance" in which everyone accepts it as a given that they must achieve and maintain a balanced system.

Besides CDMA cellular systems, non-cellular systems, such as WiFi 802.11 systems and WiMax 802.16 systems, also suffer from co-channel interference in high-rise and other environments because of a low frequency reuse factor.

It is against this background and with a desire to improve on the prior art that the present invention has been developed.

SUMMARY

One aspect relates to a repeater for a 2-way mobile communication system having a plurality of base stations and subscriber units that communicate via RF signals includes a base-side antenna that is directed toward at least one of the base stations to receive transmitted RF signals from the base station, the antenna generating a received downlink signal therefrom. The repeater also includes an amplifier receptive of the received downlink signal, the amplifier amplifying the level of the received downlink signal to generate an amplified downlink signal. The receiver further includes a subscriber-side antenna located proximate to the base-side antenna, the subscriber-side antenna being receptive of the amplified downlink signal, the subscriber-side antenna transmitting RF signals representative of the amplified downlink signal within a local area to subscriber units located nearby. The repeater operates in the downlink direction between the base station and the subscriber units near the repeater.

The repeater further includes amplification in the uplink direction which is substantially less than the amplification used in the downlink. The amplification in the uplink direction includes a subscriber-side antenna receiving RF signals within a local area from subscriber units located nearby, the antenna generating an uplink received signal therefrom; an amplifier receptive of the received uplink signal, the amplifier amplifying the received uplink signal by a substantially smaller level then used in the downlink, and which generates an amplified uplink signal; and a base-side antenna that is directed toward at least one of the base stations, the subscriber-side antenna being receptive of the amplified uplink signal, and which transmits RF signals representative of the amplified uplink signal to the base station. The repeater operates in the uplink direction between the subscriber and the base station units near the repeater and the presence of the repeater in the downlink and uplink directions causes an intentional imbalance in total losses between the downlink and the uplink, in order to provide for signal enhancement in both uplink and downlink over an equivalent coverage area.

The RF signals received by the base-side antenna and the RF signals transmitted by the subscriber-side antenna may be at substantially the same frequency, which is different from the frequency of the RF signals received by the subscriber-side antenna and the RF signals transmitted by the base-side antenna. The repeater may further include a repeater housing in which the subscriber-side and base-side antennas are located. The base-side and subscriber-side antennas may be located within two meters of each other.

The amplifier may include circuitry therein to substantially prevent saturation. The circuitry may substantially prevent saturation by periodically incrementing the magnitude of amplification toward an oscillation condition and testing for same. The circuitry may reset the magnitude of amplification to a smaller level during periodic testing for oscillation, and to a much smaller level for sudden occurrences of oscillation, in order to minimize the length of time for which steady amplification is interrupted. The period with which the circuitry resets the magnitude of amplification may be gradually increased from a relatively shorter duration toward a relatively longer duration if successive tests for oscillation indicate a steady and adequate amplification setting, and wherein the reset period may be decreased when oscillation is detected.

The base-side and subscriber-side antennas of the repeater may be positionable by the operator for signal enhancement. The amplifier may provide an external indication of the magnitude of amplification and wherein the subscriber uses the external indication to optimally position the base-side and subscriber-side antennas of the repeater. The repeater may be effective in substantially eliminating co-channel interference in the vicinity of the repeater, such as within ten meters of the repeater. The subscriber units and the base-side and subscriber-side antennas of the repeater may all be located in the vicinity of each other and all are in an environment receiving signals of adequate signal strength from multiple base stations.

The mobile communication system may include a downlink direction in which signals are transmitted from the base stations to the subscriber units and an uplink direction in which signals are transmitted from the subscriber units to the base stations and wherein the repeater system is employed in both the downlink and uplink directions, creating an intentional imbalance in order to resolve co-channel interference while minimizing the risk of interference to the same communication system or to other communication systems.

The base-side and subscriber-side antennas may be isolated from each other using cross-polarization achieved by mechanical orientation or by electrical rotation. The base-side and subscriber-side antennas may be isolated from each other using a metallic chassis. The difference in uplink and downlink amplification may be limited in magnitude to maintain the capacity of the mobile communications system to support link imbalance in a 2-way system. The repeater may further include a secondary interior repeater for two-way amplification between the first repeater and the subscriber.

Another aspect relates to a repeater system for a 2-way mobile communication system having a plurality of base stations and subscriber units that communicate via RF signals, including a first repeater and second repeater. The first repeater includes: a base-side antenna that is directed toward at least one of the base stations to receive transmitted RF signals from the base station, the antenna generating a received downlink signal therefrom; an amplifier receptive of the received downlink signal, the amplifier amplifying the level of the received downlink signal to generate an amplified downlink signal; and a subscriber-side antenna located proximate to the base-side antenna, the subscriber-side antenna being receptive of the amplified downlink signal, the subscriber-side antenna transmitting RF signals representative of the amplified downlink signal within a local area. The second repeater includes: a base-side antenna that is directed toward the first repeater to receive transmitted RF signals from the first repeater, the antenna generating a received downlink signal therefrom; an amplifier receptive of the received downlink signal, the amplifier amplifying the level of the received downlink signal to generate an amplified downlink signal; and a subscriber-side antenna located proximate to the base-side antenna, the subscriber-side antenna being receptive of the amplified downlink signal, the subscriber-side antenna transmitting RF signals representative of the amplified downlink signal within a local area to subscriber units located nearby.

The second repeater operates in the downlink direction between the base station and the local area. The second repeater further includes amplification in the uplink direction which is substantially less than the amplification used in the downlink. The subscriber-side antenna of the second repeater receives RF signals within a local area from subscriber units located nearby, the antenna generating an uplink received signal therefrom. The amplifier of the second repeater is receptive of the received uplink signal, the amplifier amplifying the received uplink signal by a substantially smaller level then used in the downlink and generating an amplified uplink signal. The base-side antenna of the second repeater is directed generally toward at least one of the base stations, the base-side antenna being receptive of the amplified uplink signal and transmitting RF signals representative of the amplified uplink signal to the at least one of the base stations. The second repeater operates in the uplink direction between the subscriber and the first repeater and the presence of the second repeater in the downlink and uplink directions causes an intentional imbalance in total losses between the downlink and the uplink, in order to provide for signal enhancement in both uplink and downlink over an equivalent coverage area.

Another aspect relates to a repeater for a mobile communication system having a plurality of base stations and subscriber units that communicate via RF signals. The repeater includes a base-side antenna that is directed toward one of the base stations to receive transmitted RF signals from the base station, the base-side antenna generating a received signal therefrom. The repeater also includes an amplifier receptive of the received signal, the amplifier amplifying the level of the received signal to generate an amplified signal, the amplifier including circuitry therein to substantially prevent saturation by incrementing the magnitude of amplification toward an oscillation condition and testing for same. The repeater further includes a subscriber-side antenna located proximate to the base-side antenna, the subscriber-side antenna being receptive of the amplified signal, the subscriber-side antenna transmitting RF signals within a local area to subscriber units located nearby.

The repeater may further include a repeater housing in which the base-side and subscriber-side antennas are located. The repeater may further include an uplink amplifier of substantially less amplification than the downlink amplifier.

The mobile telecommunication system may include a downlink direction in which signals are transmitted from the base stations to the subscriber units and an uplink direction in which signals are transmitted from the subscriber units to the base stations, and the presence of the repeater may cause an intentional imbalance in total losses between the downlink and the uplink directions. The amplification may be limited in magnitude to maintain the capacity of the mobile communication system to support link imbalance.

The repeater may be effective in substantially eliminating co-channel interference in the vicinity of the repeater, such as within ten meters of the repeater. The subscriber units and the base-side and subscriber-side antennas of the repeater may all be located in the vicinity of each other and may all be receiving signals of adequate signal strength from multiple base stations.

The mobile telecommunication system may include a downlink direction in which signals are transmitted from the base stations to the subscriber units and an uplink direction in which signals are transmitted from the subscriber units to the base stations and the repeater system may be employed in the downlink direction only.

The mobile telecommunication system may include a downlink direction in which signals are transmitted from the base stations to the subscriber units and an uplink direction in which signals are transmitted from the subscriber units to the base stations and the repeater system may be employed in both the downlink and uplink directions, creating an intentional imbalance in order to provide enhanced subscriber service while minimizing the risk of interference to the same communication system or to other communication systems.

The saturation-prevention circuitry may reset the magnitude of amplification to a smaller level during periodic testing for oscillation, and to a much smaller level for sudden occurrences of oscillation, in order to minimize the length of time for which steady amplification is interrupted.

The elapsed time after which the circuitry resets the magnitude of amplification may be gradually increased from a relatively shorter duration toward a relatively longer duration if successive tests for oscillation indicate a steady and adequate amplification setting, and the reset period may be decreased when oscillation is detected.

Another aspect relates to a method for substantially eliminating co-channel interference in a local area containing subscriber units receiving adequate signals from a plurality of base stations. The method includes co-locating a subscriber-side antenna and a base-side antenna within an environment receiving signals of adequate signal strength from multiple base stations to provide downlink amplification and substantially lower uplink amplification. The lower level of uplink amplification substantially reduces the risk of creating interference to the same communication system or to other communication systems.

Link imbalance may be intentionally caused between the downlink and the uplink directions, said link imbalance being less than the telecommunication system's capacity for tolerating link imbalance. The method may further include substantially preventing saturation by periodically testing for oscillation with a minimum of service interruption and then setting the amplification to a maximum magnitude.

Numerous additional features and advantages of the present invention will become apparent to those skilled in the art upon consideration of the further description that follows.

BRIEF DESCRIPTION OF THE DRAWINGS

FIG. 13 is a plot of the amplification gain of the repeater system of the present invention during various stages of dwell time, described by the algorithm shown in FIG. 8

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with solving pilot pollution problems in high-rise buildings, it should be expressly understood that the present invention may be applicable to other applications where a solution to co-channel interference in strong signal environments is required/desired. In this regard, the following description of a system that solves pilot pollution problems in high-rise buildings is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
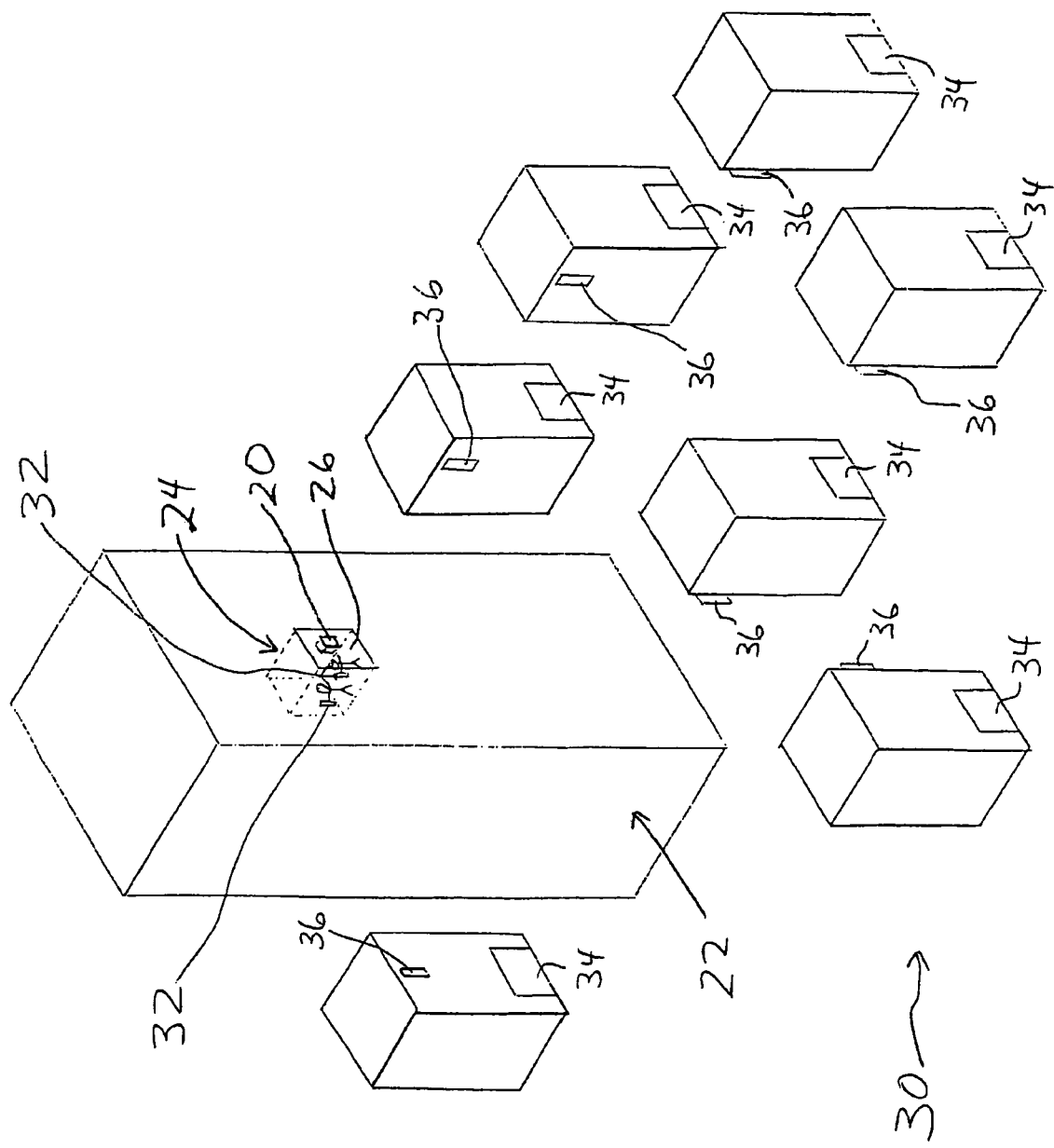
FIG. 1 is an illustration of the setting in which the repeater system of the present invention can be used.

A repeater system 20 of the present invention is shown in FIG. 1. As can be seen, the repeater system 20 is located in a high-rise building 22, in the interior of an external room 24 in the building, preferably near a window 26. As will be the case in the vicinity of most any high-rise building in the world, a mobile or cellular telephone system 30 exists in the surrounding area of the building 22. Located within or nearby the room 24 in the building 22 may be one or more subscriber units 32 (cellular or other wireless telephones).

The mobile telephone system 30 includes a plurality of base stations 34 located in the vicinity of the building 22. As is well known, each of these base stations 34 may operate at different transmit and receive frequencies than adjacent base stations 34 for TDMA and GSM technology systems, while they may operate at the same transmit and receive frequencies as adjacent base stations for CDMA technology systems. While the present invention is not limited to CDMA systems, the embodiments described herein all may refer to CDMA systems, purely for convenience. The present invention applies to any spread spectrum communications system, and to any communications system with a frequency reuse factor that results in debilitating co-channel interference in some locations. Each base station 34 has an antenna system 36 associated therewith.

Figure 2:
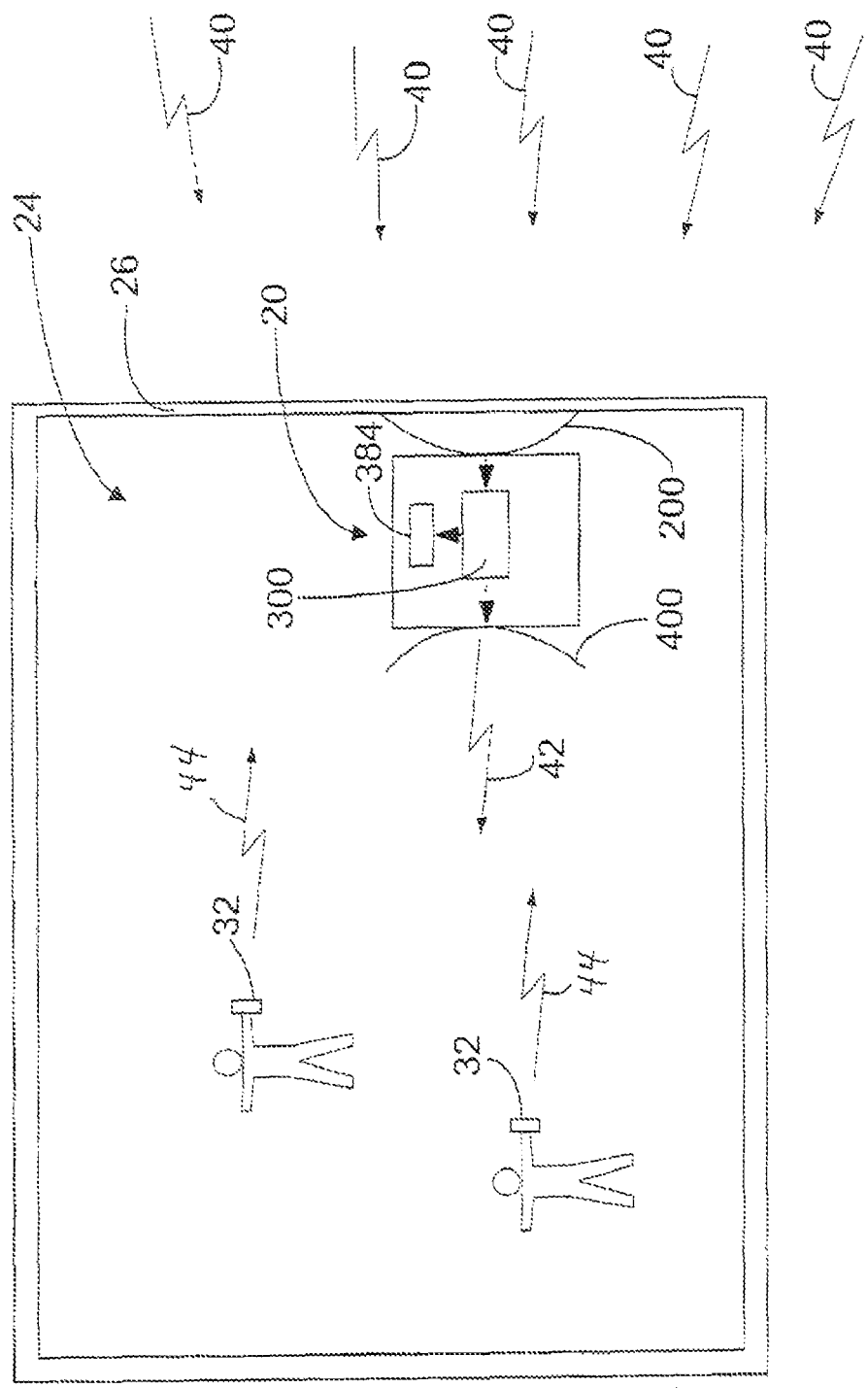
FIG. 2 is an illustration of a portion of the setting shown in FIG. 1, showing an exterior room in a building.

As shown in FIG. 2, there may be several subscribers carrying subscriber units 32 in the room 24 having a window 26. It can be seen that there are many competing downlink signals 40 that would be potentially received by the subscriber units 32 were it not for the presence of the repeater system 20. The repeater system 20 receives selected ones of these downlink signals 40 via a base-side antenna 200, amplifies them with an amplifier 300, and transmits an amplified downlink signal 42 from a subscriber-side antenna 400. Stability control circuitry 384 maintains maximum gain as the isolation between antennas 200 and 400 varies. Due to the relatively greater signal strength of the amplified downlink signal 42 in the vicinity of the repeater system 20, each of the subscriber units 32 use that signal 42 rather than the competing downlink signals 40. The subscriber units 32 send uplink signals 44 directly back to the base station in conventional fashion. There is generally no need for a repeater system for the uplink direction, although one could be employed to keep link imbalance within the system's capacity to support link imbalance, or if greater service range is desired.

Figure 3:
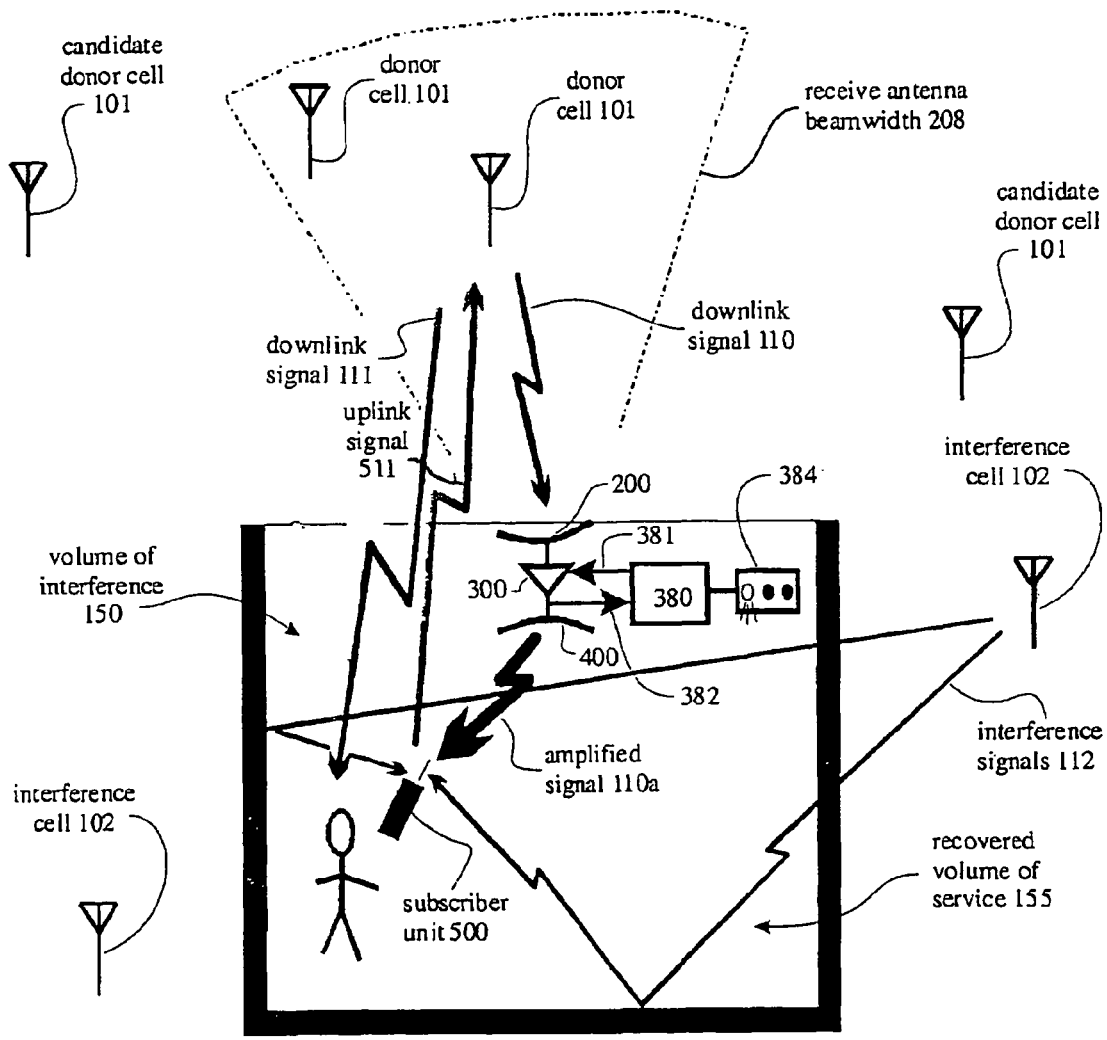
FIG. 3 is an illustration of repeater system of the present invention in a typical setting.

FIG. 3 illustrates CDMA co-channel interference signals and the operation of an interference repeater in a windowed room. As shown in FIG. 3, a two-way cellular network 100 blankets the user area with many strong signals. The user area, generally an indoor office or apartment, resides in a strong signal environment (greater than −90 dBm), common to high-rise urban locations, and is receiving same-frequency signals from two or more base stations of the desired communication system (provider). Cellular network 100 is composed of cell sites (base stations), telephony switches, backhaul, and all other elements necessary to create a voice and data infrastructure. Network 100 provides wireless access to cellular subscriber units 500. Candidate donor cell sites 101 each provide a strong line-of-sight (LOS) communications downlink signal 111 to the subscriber and downlink signal 110 to the base-side antenna 200 of the repeater 20. Signals 110 and 111 may be approximately equal to each other, and uniform over the region of strong or adequate signal strength from multiple signals, which may be called the volume of interference 150. Often, these candidate donor cells can be visually seen through a window in the user area, and most of the energy contained in the LOS signals 110 and 111 lie within a relatively narrow range of azimuth. This may allow the base-side antenna 200 to be a moderately directional antenna of beamwidth <180°, possibly in the range of 60° to 120°. Once signals 111 penetrate into a metallic environment, like a windowed office, reflection and diffraction on edges and surfaces spread the energy over a wider angle approaching 360°, reducing the fraction of available energy that can be collected from a directional antenna.

The complement to downlink signal 111 is uplink signal 511, which possesses approximately the same path loss after averaging out small-scale signal fading. A balanced path exists when the downlink path loss, defined as the difference between donor cell transmit power and subscriber received power, equals the uplink path loss, defined as the difference between subscriber transmit power and donor cell received power.

Interference cell sites 102 provide strong non-line-of-sight communications signals 112 to subscriber unit with much scattering by objects in the environment. These signals arrive over a wide range of azimuth angles approaching 360 degrees. For instance, these signals 112 may bounce off other buildings and come through side walls before arriving in the user area. In general, signals from interference cells 102 (non-LOS) are not collectable, and do not represent qualified donor cells.

As one moves further into a scattering environment, such as a building, it becomes increasingly difficult to select specific donor cells using a directional antenna. Therefore, the best place to collect LOS or near-LOS signals may be at the edge of a scattering environment, such as near a window, pointed away from scattering objects.

Co-channel interference occurs when two or more AMPS, TDMA, or GSM signals of the same frequency are received by the subscriber within the volume of interference 150, at the same time, and at comparable signal levels (such as signals 111 and 112). For CDMA, interference can occur when four or more signals of the same channel are received in the user area at comparable signal levels, and the interference is called pilot pollution. A beacon signal called the pilot is always transmitted from each CDMA cell site, which subscribers select and receive in order to be ready for a call. When the subscriber unit is on but not in a call, co-channel interference (or pilot pollution) prevents a cellular call from initiating, or at least reduces the likelihood of a successful initiation (call set-up). When a two-way call is in progress, co-channel interference degrades call quality as signal conditions vary (which occurs as the subscriber unit wanders within the user area), and may cause the call to drop completely.

Figure 4:
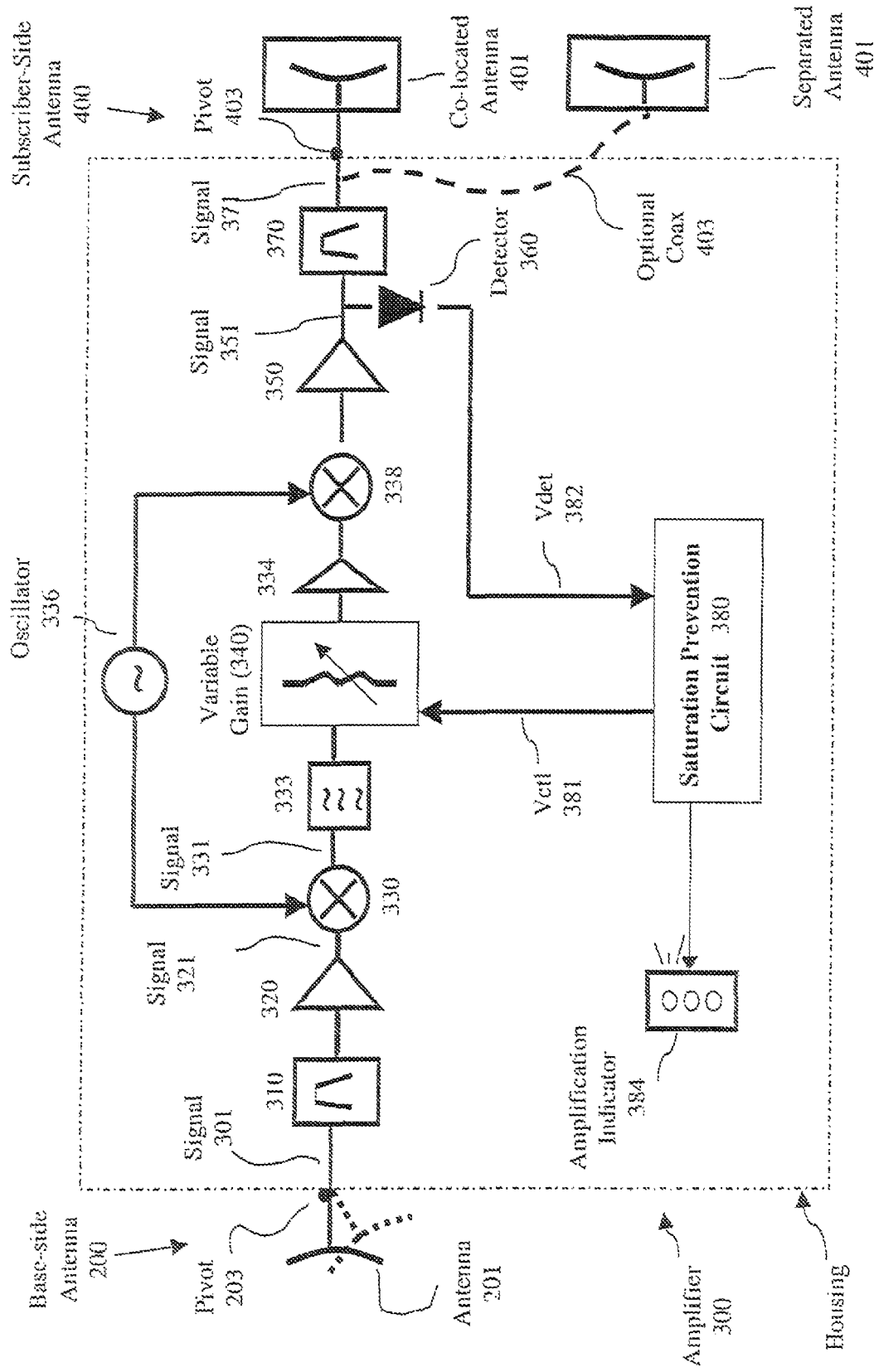
FIG. 4 is a block diagram of the repeater system of the present invention containing downlink-only amplification.

The base-side antenna 200 (FIGS. 3 and 4) selects signals 110 from one to three candidate donor cells 101. The base-side antenna 200 may have a horizontal beamwidth 208 (FIG. 6) sufficiently wide enough to collect most of the power from each line-of-sight candidate cell 101, and sufficiently narrow to reject all but one to three candidate donor cells, and pointed typically out a window, converts the signal 110 into an electrical signal 301 (FIG. 4). All other candidate donor cells and most interference cells are rejected by the narrow beamwidth 208 of the base-side antenna 200. Since the repeater 20 is a short distance (typically less than ten meters) from the subscriber unit, the signal 110 received by the repeater 20 is approximately equal in strength to signal 111 available at the subscriber unit directly from the donor cell 101.

The antenna 200 may include a patch antenna 201 and an optional pivot 203 (FIG. 4) that allows the installer to point the base-side antenna 200 in different directions in order to select one to three strong donor cells. To install the repeater, the installer or subscriber iterates the mounting location of repeater 20 and pointing angle of the patch antenna 201 while monitoring downlink audio quality and an amplification indicator 384, until maximum amplification is obtained and audio quality is improved. Further detail on this iterative process is available in FIG. 5 and the accompanying description.

Figure 11:
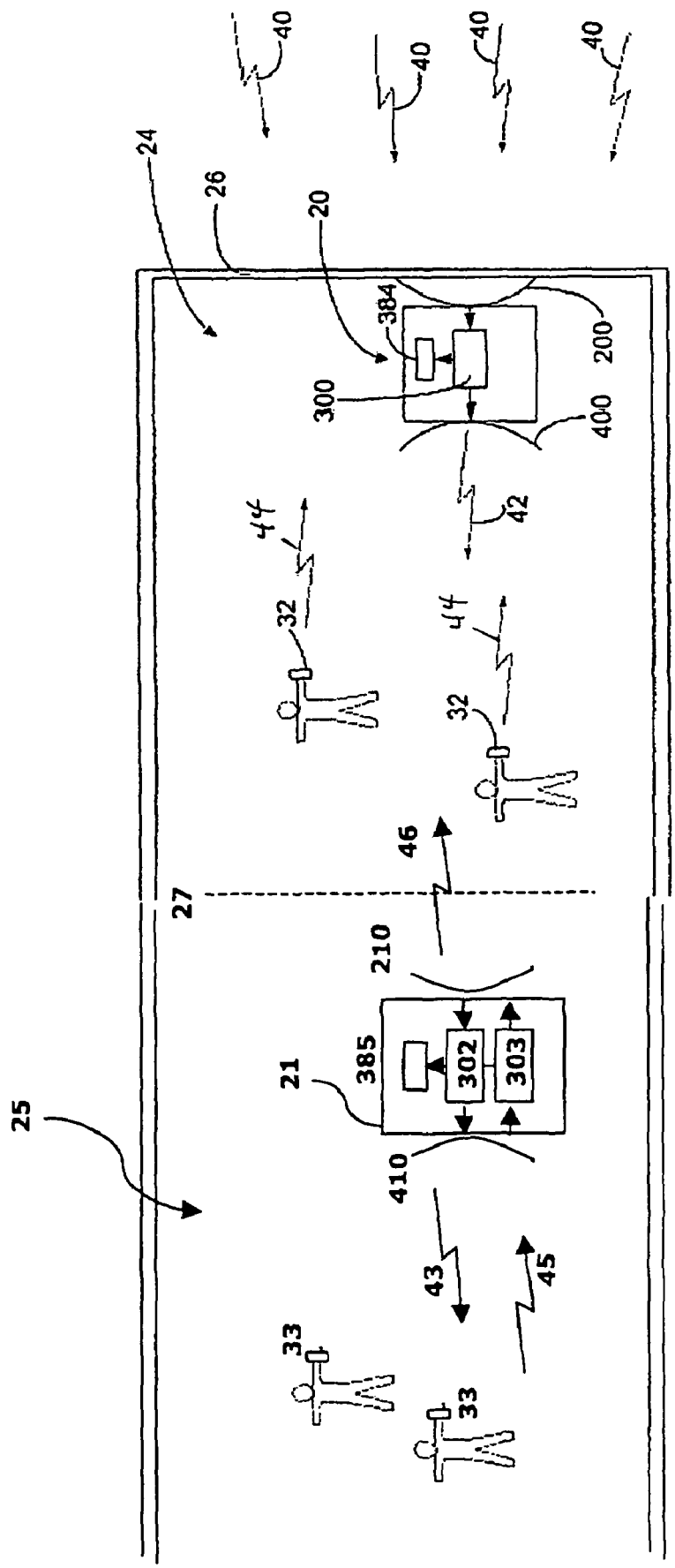
FIG. 11 is an illustration of a portion of the setting shown in FIG. 1, showing an exterior and interior room of a building.

As shown in FIG. 11, two repeaters could be used to allow subscribers to utilize their subscriber units in an interior room. A first repeater 20 provides downlink-only amplification of selected signals 40 out to a distance limit 27. In actuality, the distance limit 27 is not nearly as sharply- or well-defined as illustrated. A secondary interior repeater 21 extends 2-way signal enhancement to the interior 25 of the building. Secondary interior repeater 21 has an uplink amplifier 303 whose gain and rated power output is substantially less than the gain of a downlink amplifier 302, and where the uplink gain compensates for additional link imbalance which occurs due to repeater 20, and/or compensates for opposite signal fading which is greater in the building interior than at the window, and/or which compensates for additional signal losses between distance limit 27 and window 26. The uplink gain is of substantially lower saturated power and lower gain, having just enough gain to maintain a limited link imbalance for subscribers close to antenna 410. There may be several subscribers carrying subscriber units 33 in interior room 25. Competing downlink signals 40 and weak amplified downlink signals 42 penetrate into room 25 and they would be potentially received by the subscriber units 33 were it not for the presence of the repeater system 21. The repeater 21 receives downlink signal 42 from repeater 20 via an antenna 210, amplifies them with a downlink amplifier 302, and transmits a secondarily-amplified downlink signal 43 from an antenna 410. Stability control circuitry 385 maintains maximum gain as the isolation between antennas 210 and 410 varies. Due to the relatively greater signal strength of the secondarily-amplified downlink signal 43 in the vicinity of the repeater 21, each of the subscriber units 33 use that signal 43 rather than the competing downlink signals 40 or weak amplified downlink signals 42. The subscriber units 33 send uplink signals 45 to antenna 410, which are amplified by uplink amplifier 302, and transmit amplified uplink signal 46 directly back to the base station via antenna 210.

Figure 5:
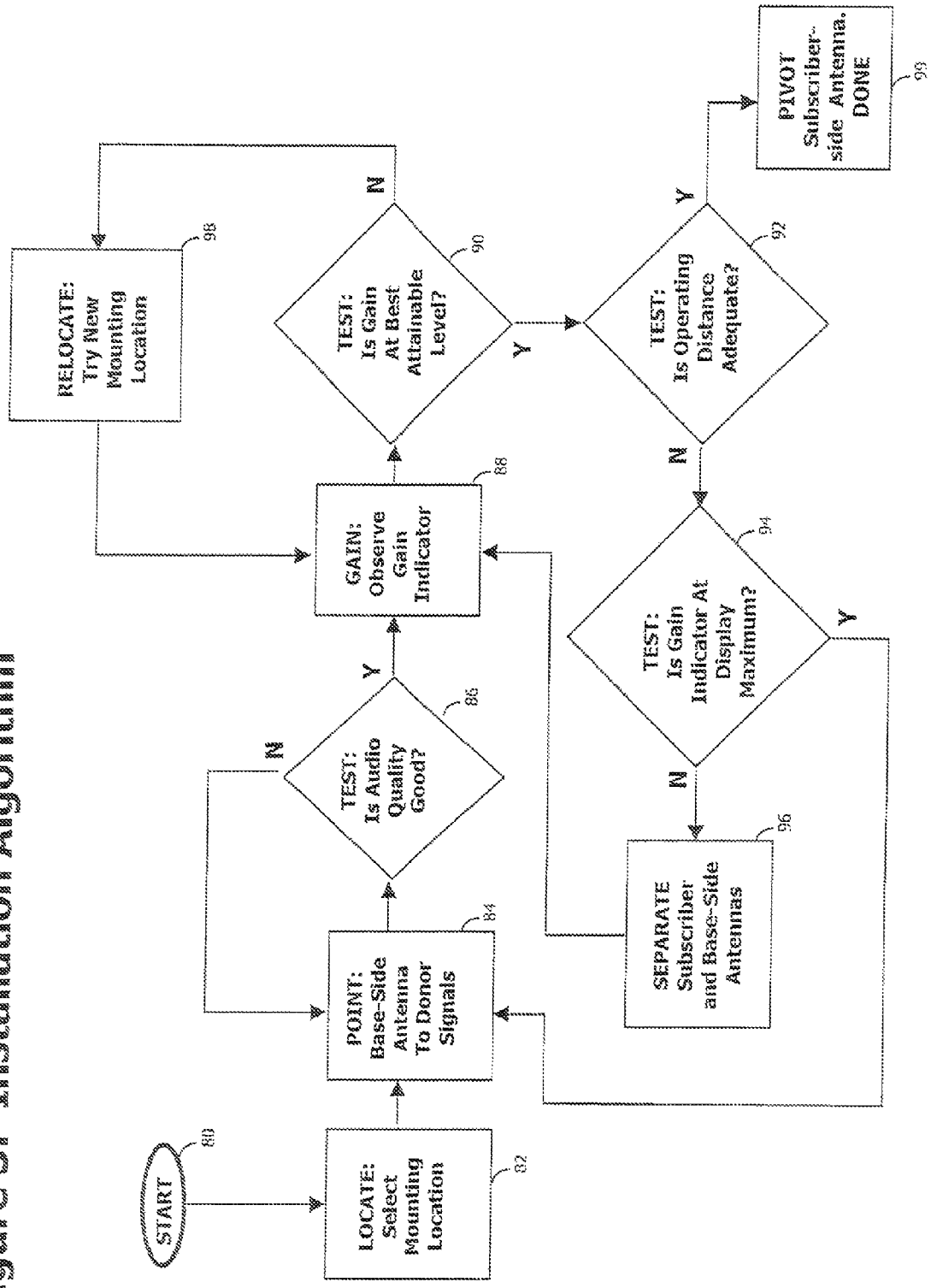
FIG. 5 is a block diagram of an algorithm of the present invention for optimally setting-up the repeater system of the present invention.

One procedure for installing and optimizing a primary window repeater 20 is shown in FIG. 5. The same procedure can be extended to a secondary interior repeater 21, where a ceiling mount is chosen instead of a window, and where the primary repeater is the indirect source of a donor signal instead of donor base stations directly.

Refer to FIGS. 4, 5, 11, and 12 for the following description. First, repeater 20 is turned on (step 80), and located (82) near or on a window. Optimally, suction cups are used to quickly attach the repeater to a window facing into the user's office or apartment. Alternatively, the repeater can be mounted on a table fixture or inside a lamp for positioning within 1 m of a window. Next, repeater 20, containing antennas 200 and 400, is pointed (84) towards line-of-sight donor cells 101. Standing at one to two meters distance from and in front of the subscriber-side antenna 400, having established a call, the user monitors (86) the received audio quality of subscriber unit 32 for muting and audio signal break-up, and adjusts the pointing angle of base-side antenna 200 until minimal audio muting or degradation occurs. (The repeater is optimized to work well at or beyond some minimum operating distance naturally encountered in the subscriber's environment (e.g. 1 m). At this minimum operating distance, link imbalance will be just within the system's capacity to support imbalance, so it is important to not stand within this minimum distance during installation.) If the tested audio quality is inadequate or not improved (NO), another pointing direction is chosen (84) and the audio quality retested (86). Generally, given a 60-90 degree horizontal beamwidth 208 (FIG. 6), only 3 possible pointing directions need be evaluated and one or more of those will work well.

Once one or more pointing directions are found to yield good audio quality at 1-2 meters distance (YES), the user observes (88) the gain indicator 384 and optimizes the mounting location for maximum gain, maintaining the same pointing direction discovered in the previous steps. In the preferred embodiment, the gain indicator may indicate low, medium, or high gain, each being 5 dB different in level. If the gain indicator is not at maximum (NO), there may be too much coupling between antennas 200 and 400 due to nearby metal, window framing, metallized tint, or other room reflections. The user then relocates (98) the mounting location and observes the gain, iterating to get the best possible gain indication, averaged as the user moves about the room.

Once gain has been optimized (YES), the user moves about the room, listening to downlink audio quality received during an active call, and notes (92) the usable operating distance of the device within and beyond the area he or she desires to improve. If performance is adequate (YES), the installation is complete and any final mounting attachments can be secured. The user may adjust pivot 403 of subscriber-side antenna 400 in order to illuminate more uniformly the room area over which call quality improvement is desired. If operating distance is not adequate (NO), then the gain indicator 384 is checked to see if displayed gain is at its maximum indication (94). If NO, then antenna 400 can be removed (96) from the unified housing in order to create more isolation between antennas 200 and 400, and a coaxial cable (not shown) can be inserted between the repeater and the subscriber-side antenna 400.

If gain is at maximum (step 96, YES result) but operating distance is inadequate, then it may be necessary to iterate base-side pointing steps 84 and 86, and then re-optimize the mounting location using steps 88, 90, and 98.

Repeater 21 is installed near the edge of coverage boundary 27 and pointed to a primary repeater 20. Then, the same steps as above are used to establish a maximal area of improved service over area 25. Because there is additional uplink signal loss between repeaters 20 and 21, there may be excessive link imbalance at a 1 meter distance between subscriber 33 and repeater 21, reducing the ability to establish a successful communications link. It may be necessary to reduce the link imbalance experienced by subscribers 33 at the closest natural operating distance by reducing the gain of repeater 21. Excess link imbalance can be reduced by reducing downlink amplification using an adjustable external gain adjustment. In cases where repeater 21 has an uplink amplifier, uplink gain can be increased until communications can be reliably established at the closest natural distance between subscriber 33 and repeater 21.

Returning to one-way repeater 20, the amplifier 300 (FIG. 4) suitably amplifies the received signal 110 for the downlink as follows. Electrical signal 301 passes through filter 310, which rejects signals other than those desired for user communication which either could cause electrical overload of the amplifier chain, or which, when amplified, could create interference for other users. Typically, this filter is wide enough to pass the entire PCS or cellular spectrum, or a licensed band within the PCS or cellular spectrum, and is narrow enough to reject the opposite link direction and other adjacent telecommunications services.

An amplifier 320 increases the amplitude of the received signals 301. Band-select or channel-select stages 330, 333, 334, 336, and 338 may be included for additional filtering, beyond that of filter 310, in the event more protection from, or less interference to, other telecommunications users is needed. Amplified signal 321 is translated to an intermediate frequency by mixer 330. IF stage 333 filters the translated signal 331 to obtain the desired interference protection. Mixer 338 translates the intermediate frequency signal back to the original frequency of signal 321. Local oscillator (LO) 336 provides an un-modulated RF carrier to facilitate mixers 330 and 338.

Figure 6:
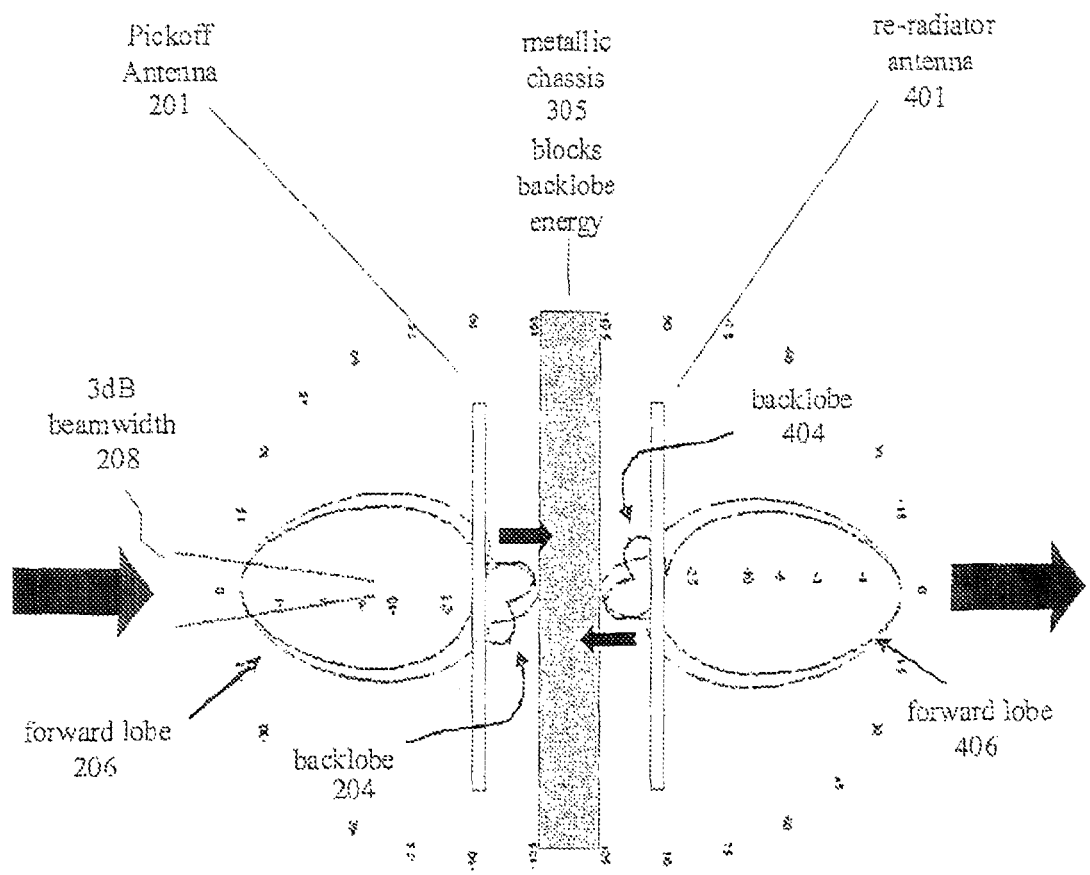
FIG. 6 is an illustration of typical RF energy patterns associated with the repeater system of the present invention.
Figure 7:
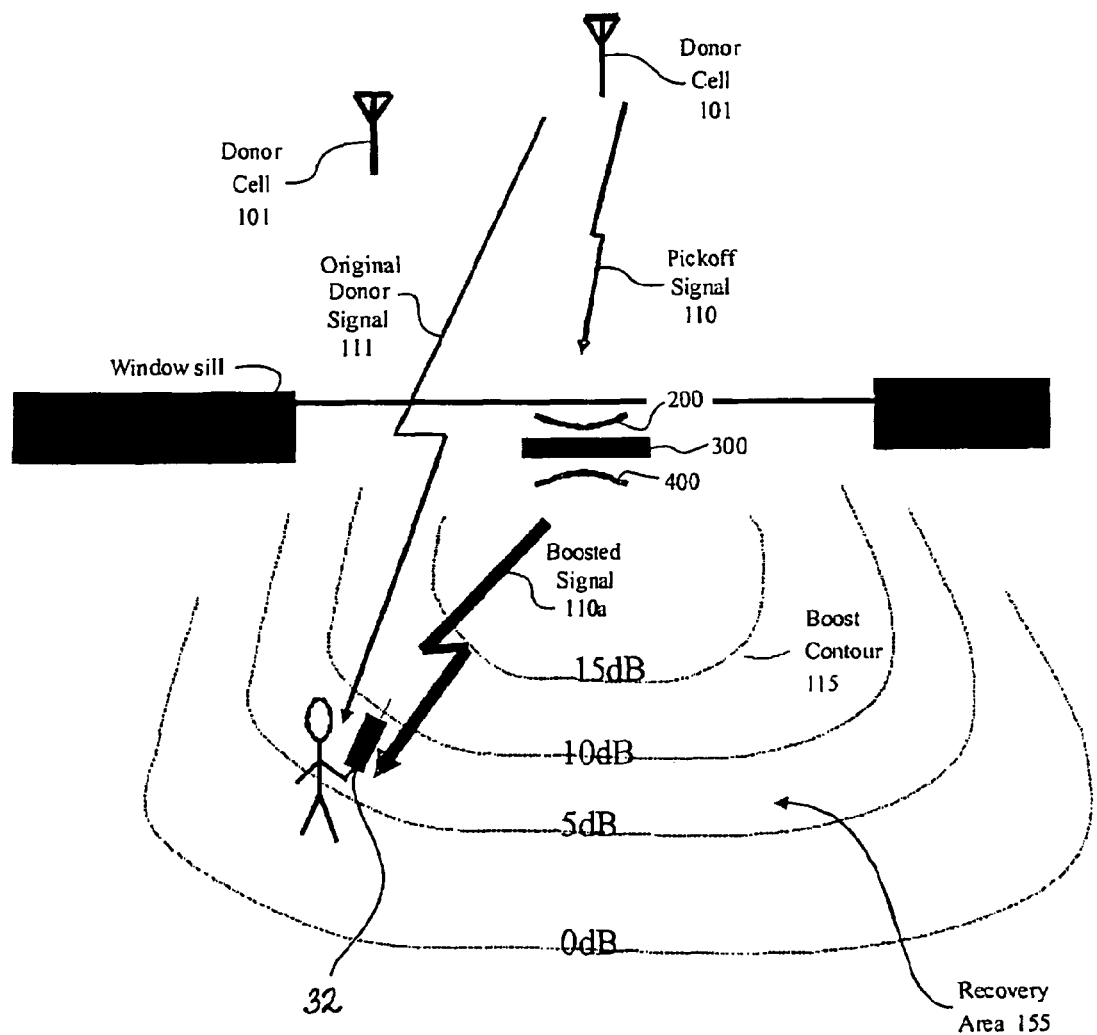
FIG. 7 is a map of approximate values of RF energy associated with the repeater system of the present invention.

Variable gain/attenuation stage 340 reduces the amplified signal 321 to keep the overall amplifier chain from causing excessive power output due to oscillation or excessively strong input signals. Oscillation can occur if receive antenna 200 and transmit antenna 400 are not electrically isolated by an amount greater than the amplification of the amplifier chain. FIGS. 6 and 7 provide some illustration of RF signal levels in the vicinity of the repeater system and the subscriber unit 32. Intermediate amplifier 334 sets the signal level entering mixer 338 for optimum linearity. A saturation protection circuit 380 controls the variable gain/attenuation stage 340 via a $V_{etl}$ (control voltage) signal 381, and controls an amplification indicator 384.

Amplifier 350 provides final amplification to signal 301 necessary to achieve the desired and stable amplification for the amplifier chain. The amplified signal 351 is measured by detector 360 to determine if output power exceeds a preset threshold approaching saturation, indicating oscillation or excessively strong input signals. Filter 370 performs final filtering to prevent interference to other telecommunications users and systems.

Amplifier 300 limits the maximum amplification to a level which permits reliable communications within the capacity of the system to support imbalanced operation. In the case when the repeater contains an uplink amplifier chain, the difference in uplink and downlink gain is limited to a level that permits reliable communications within the capacity of the system to support imbalanced operation.

Figure 12:
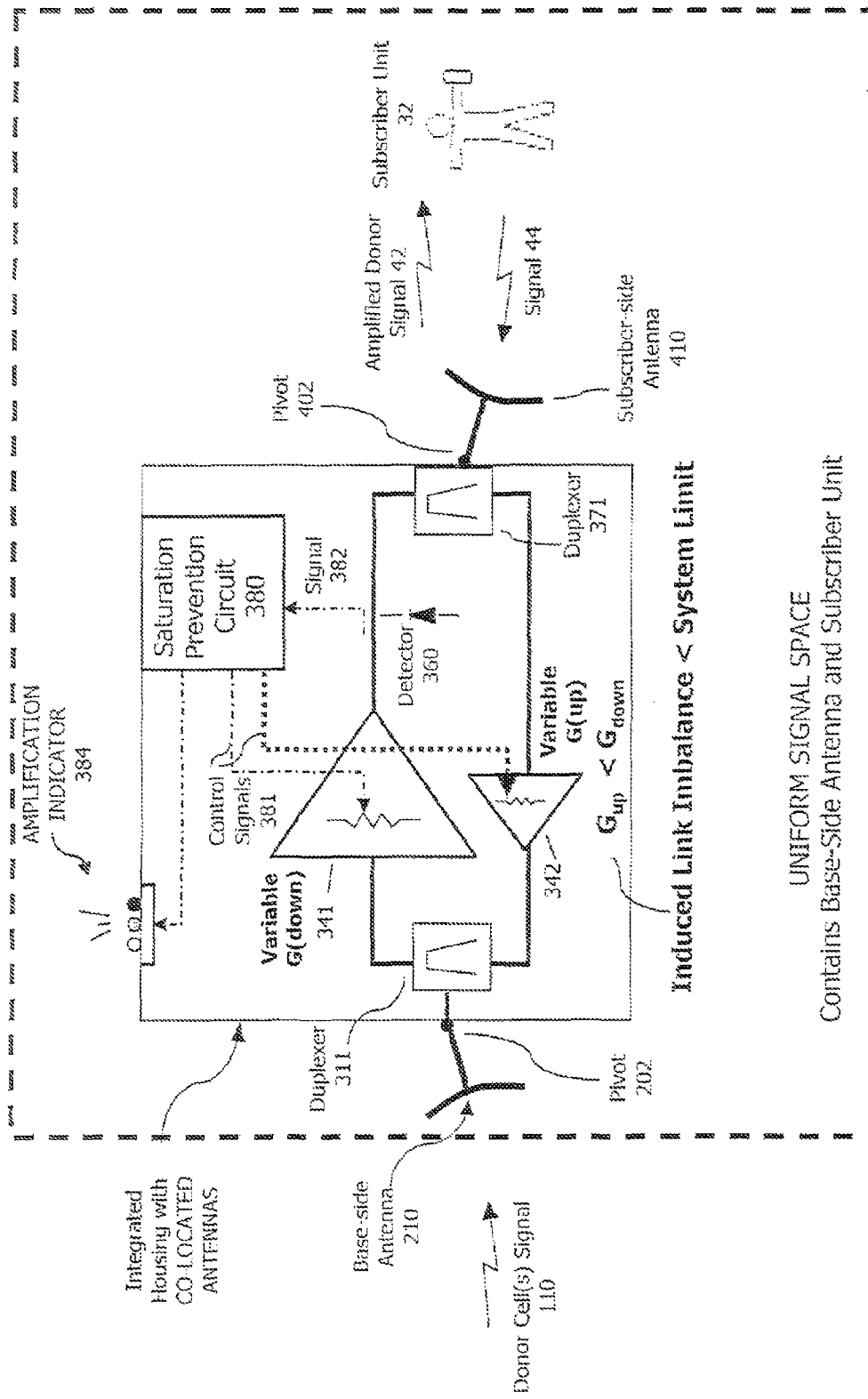
FIG. 12 is a block diagram of the repeater system of the present invention containing weak uplink amplification.

FIG. 12 shows simplified amplifier chains for the repeater 21 with downlink gain and a substantially weaker uplink gain, this time as the only repeater rather than as a secondary interior repeater. Although, shown as the only repeater in the system, this two-way repeater 21 could also be used as a secondary interior repeater or in any other suitable arrangement. Further, for the case of two repeaters, they could both be two-way, they could both be one-way or there could be one of each as described above for FIG. 11. Band-select or channel-select stages, such as 330, 332, 333, 334, 336, and 338 described in FIG. 4, may be included in order to enhance performance, if desired. For the downlink repeater chain, base-side signal 110 is received by antenna 210 and filtered by duplexer 311. Variable gain stages 341 amplify the filtered signal to create a signal that is detected by detector 361 and filtered by duplexer 371, supplying amplified donor signal 42 radiated by subscriber-side antenna 410 to the subscriber unit. Amplified donor signal 42 is dominant over interference signals within the volume of interference 150. Typically, downlink amplification will be 45-50 dB. In order to maintain link imbalance within the capacity of the system to support link imbalance, an uplink amplifier chain may be used (this is particularly the case if the repeater 21 is positioned in a building core area and using a primary repeater as its donor cell, as shown in FIG. 11). Subscriber signals 44 are transmitted from the subscriber unit 32 and received by subscriber-side antenna 410 where they are filtered by duplexer 371. Collected uplink signals are then amplified by variable gain stage 342. Amplified uplink signals are passed to duplexer 311 and provided to base-side antenna 210 for transmission back to the source of the donor cells. Typically, uplink amplification can be 10-20 dB less than downlink gain and still maintain reliable cellular service for the subscriber.

In a weaker-uplink embodiment of the invention, uplink amplification is substantially less than downlink amplification (6 dB or more difference) in order to minimize the potential for interference to same and adjacent-spectrum cellular systems.

Figure 8:
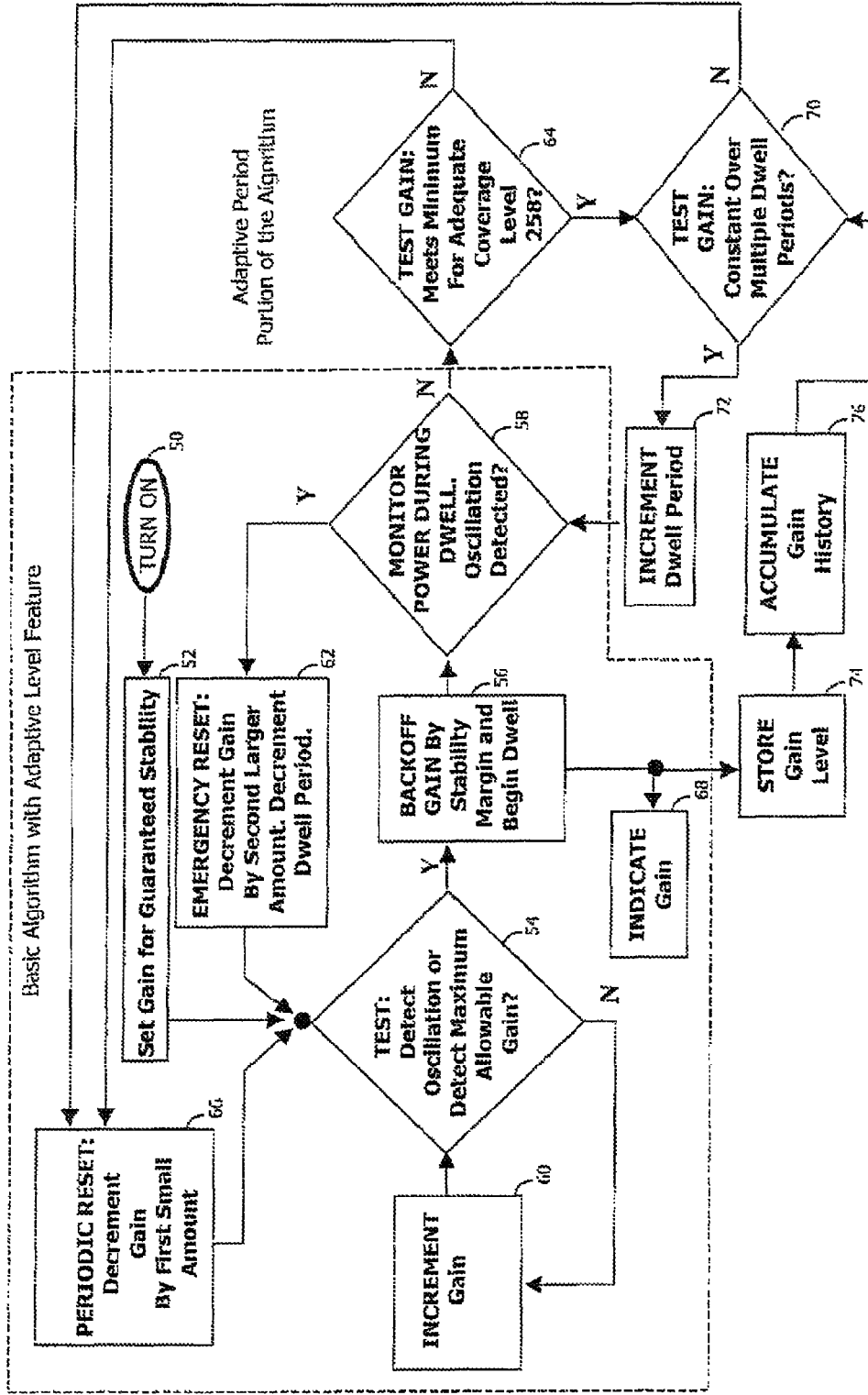
FIG. 8 is a block diagram of an algorithm of the present invention for preventing saturation with the repeater system of the present invention.
Figure 9:
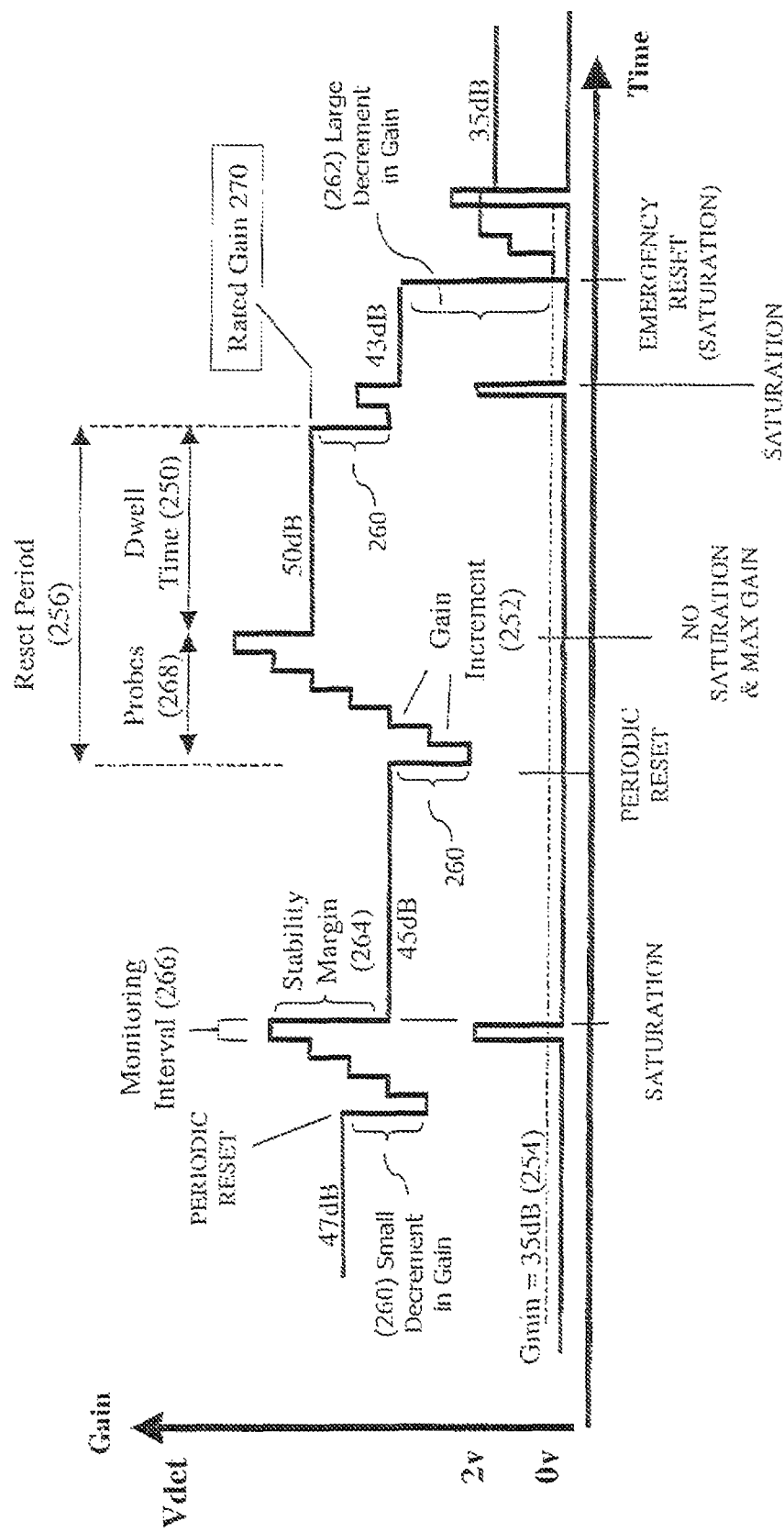
FIG. 9 is a plot of the amplification gain of the repeater system of the present invention during various stages of gain, described by the algorithm shown in FIG. 8.

Saturation-prevention circuit and algorithm 380 maximizes the amplification while minimizing gain interruptions to the user and minimizing the occurrence of oscillation in user and adjacent spectra. In the following description, the term gain will be used, instead of amplification, for briefness. Since the base-side antenna 200 and subscriber-side antenna 400 (or 210 and 410) are co-located, the electrical isolation may not be sufficient to allow maximum available gain from the amplifier chain without oscillation. Electrical isolation will vary over time as the user moves about the user area, and depends greatly on the size and construction of the room in which the repeater is located. An automatic saturation-prevention circuit and algorithm is therefore needed to test for oscillation and to set the gain at just below that which causes oscillation, as shown in FIG. 8, in a way that minimizes interruption to the call in progress. A plot of the gain of the repeater system 20 during various stages of this algorithm is shown in FIGS. 9 and 13. FIG. 8 describes the algorithm for maximizing gain while avoiding instability; it contains an adaptive level feature and an adaptive period feature. FIG. 9 gives an example of periodically resetting the gain wherein the level of reduction in gain at the start of a reset cycle adapts to the cause of the reset (adaptive level). FIG. 13 gives three examples of resetting the gain wherein the period of resetting the gain adapts to the gain history (adaptive period or adaptive dwell).

Refer to FIGS. 8, 9, and 13. Upon turning on (50) the repeater 20, gain is set (52) to a low level where stability is guaranteed (e.g. 35 dB in FIG. 13), even if there is very low isolation between antennas 200 and 400 (FIG. 4). Now it is necessary to acquire a stable operating point for the repeater using algorithm blocks (54) and (60).

To establish a stable operating point for the succeeding dwell time (250), detector voltage 382 is measured (54) for indications of saturation during monitor interval 266 (typically 10 μS). The saturation threshold, indicative of possible oscillation, will typically be several dB below the actual 1 dB compression point of the final simplifier stage 350 (FIG. 4) or 341 (FIG. 12) in order to ensure reliable detection of possible oscillation. For example, a final stage power rating of 20 dBm might have a saturation detection threshold of 15 dBm. If there is no oscillation detected during the monitor interval 266, and gain has not reached the maximum gain, then gain is incremented (60) by step 252 (typically 1-3 dB). Maximum gain (e.g. 55 dB) is the rated gain 270 (e.g. 50 dB) of the repeater plus the stability margin 264 (e.g. 5 dB). Steps (60) and (54) continue until either oscillation is detected, or until maximum gain is reached. The number of incrementing steps will be larger following Turn On (e.g. 6 gain steps) than for periodic resetting because the gain must step up from a minimum (e.g. 35 dB) to the dwell level, say, 47 dB, in 2 dB steps, whereas periodic resets involve only one or two steps down from the next gain setting. Once maximum gain or oscillation occurs, algorithm reduces (56) the gain by stability margin 264 to provide adequate margin for oscillation, typically 2-8 dB. This begins the dwell time 250. After turning on the unit, the dwell time will be set to the shortest duration since the environment coupling antennas 200 and 400 is unknown and may be rapidly changing.

The sequence of incrementing gain steps are referred to as gain "probes", represented by label 268 in FIG. 9, and take up a relatively short amount of time (e.g. 20 μsec) compared to the dwell time 250 (e.g. 1 sec). Therefore, dwell time 250 is approximately equal to the reset period 256. The new gain level is indicated (68) to the user by indicator 384 as an aid in picking a mounting location that gives the highest isolation between antennas 200 and 400. Gain is also stored (74) in memory, and accumulated (76) over many reset cycles, in order to inform an adaptive period algorithm. The preceding paragraph describes how a stable operating point is reached for one period of dwell. Now we will monitor for oscillation during dwell, and describe how the algorithm adapts its gain level to its environment.

As already described, detector voltage 382 is monitored (58) during dwell for the unlikely occurrence of oscillation. Dwell is set so that, for the typical user, the algorithm tracks changes in the isolation between antennas 200 and 400 quickly enough that the periodic resetting of gain creates most of the incidences of oscillation. In that way, a short period of resetting the gain allows decrement 260 to be kept to one or two gain steps so that the amount of time for which gain is reduced is minimal, thus minimizing the length of time during which audio quality may be interrupted. But, a longer period of resetting the gain, although increasing the rate of sudden occurrences of oscillation during dwell, may reduce the net frequency with which saturation occurs, which minimizes the amount of interference that might be caused to adjacent spectrum subscribers. So there is a tradeoff between the number of occurrences of audio interruption to the user and the number of occurrences of potential interference to nearby communications devices in adjacent spectra.

The reset period is of the shortest duration (256, in FIG. 9), typically 1 second, following turn on, or when the gain is less than the minimum gain for adequate coverage 258 (FIG. 13). As gain exceeds gain 258, and if successive reset cycles result in the same gain level as previous cycles, the reset period is increased in order to minimize gain interruptions and occurrences of oscillation, eventually reaching a longest duration 257 (e.g. 100 seconds).

If oscillation is detected (58) during dwell, an emergency reset (62) occurs, whereupon gain is reduced by a large decrement 262, or all the way to the gain for guaranteed stability 254. Generally, large decrement 262 has the effect of reducing gain to stable gain 254, so there is no distinction between the two choices. Once emergency reset (62) occurs and gain is reduced, the reset period is also reduced, usually to the shortest duration 256 (e.g. 1 second). After emergency reset (62), probe sequences begin again (54, 60, 56) in order to establish a new stable operating point.

If oscillation is not detected (58), the circuit can consider lengthening the reset period. First, a test is performed (64) of whether the gain meets a minimum for adequate coverage 258, meaning the typical subscriber experiences an adequate service range. For a personal repeater, adequate gain might be 44 dB and yield a range of 3-5 meters, enough for a typical office. Although as much as 10 meters of range might be expected in an optimum deployment, it is advantageous to reduce the rate of service interruptions that potentially occur due to resetting of the gain. If the gain meets (64) level 258 (YES), the gain history is evaluated (70) to see if gain has been substantially constant for several or many cycles of reset periods. If the gain has not been particularly constant (NO), then a periodic reset (66) occurs, whereby control voltage 381 reduces the amplifier gain by small decrement 260 (usually one or two steps of 2 dB each), and an iterative probe sequence begins again in order to refresh the gain setting through steps 54, 60, and 56. If that gain in step 70 has been constant (YES), then the dwell (reset) period is incremented (72) in order to reduce the rate of service interruptions to the user without incurring a substantial increase in sudden oscillation. Successive experiences of gain constancy will gradually lengthen the reset period to a longest duration (e.g. 100 sec), which will then be retained until the isolation between antennas 200 and 400 drops enough to cause a periodic or emergency resetting of the gain, wherein a shorter reset period will be introduced. Going back to step 64, if the minimum gain for adequate coverage (258) is not met (NO), then periodic reset 66 decrements gain by small step 260, following which the gain setting refreshed through iterative steps 54, 60, and 56.

In FIG. 13, three examples of the time behavior of the adaptive period portion of the algorithm are given. All three cases start with Turn On, incrementing the gain towards a stable and maximum gain setting afforded by the antenna isolation available in the user setting. Arrows at the top of the graph show where some of the saturation occurrences (oscillation) happen due to periodic gain probes. In Case 2, a fat arrow indicates a "sudden" occurrence of oscillation during dwell and not provoked by gain probes.

Case 1 illustrates a high-isolation environment with little or no user movement near the repeater, allowing a high gain setting. Since there is little opportunity for higher gain, it is best to forgo resetting the gain and receive the benefits of no gain interruptions and no potential interference from brief oscillation.

Case 2 illustrate a medium gain situation with some user movement. Initially, the reset period is shortest 256 since there is no history of environmental stability. Then, eventually, gain constancy allows the dwell (reset period) to lengthen to 100 seconds, for example, until eventually a reduction in the isolation of the environment causes the detection of instability in step 58, leading to an emergency reset 62 and a decrementing of the reset period to 1 second. One could also implement a gradual reduction in dwell through an intermediate duration instead of dropping immediately to the shortest dwell.

Case 3 illustrates either a medium-to-high isolation environment with a temporary reduction in isolation due to user movement, or a low-isolation environment. In this case, gain is below the minimum gain for adequate coverage for the typical subscriber and so it is preferable to seek higher gain at a fast pace so that the user will experience adequate gain for the largest possible percentage of time. Therefore, the reset period 256 is at the shortest (e.g. 1 second). Note that the optimum rate for shortest and longest reset period may be a factor of 10 or more different than given in this example, depending on the application.

Referring to FIG. 6, subscriber-side antenna 400 illuminates the user area, and is isolated from base-side antenna 200. Amplified donor cells are transmitted into the user's area, creating a dominant set of signals from donor cells and overtaking the interference cells. Antennas 200 and 400 are isolated to maximize allowable amplification. Antenna isolation can achieved through cross-polarization between 200 and 400, by metallic shielding of chassis 305, through optimizing the position of the chassis, and/or by small physical separation within the volume of interference 150. The amplification indicator 384 displays the amount of amplification so the user can pick the mounting location for highest isolation and maximum allowable amplification. Amplification indicator 384 may be a visible indicator such as an LED display, an LCD display, or other suitable type of visible indicator, or it may be an audio signal whose frequency changes in proportion to amplification, or other suitable audible indicator.

The amplified donor cell signal, being an appropriately-amplified version of selected donor cell signal 110, passes to subscriber-side antenna 400, which is pointed into the user area, usually an office or apartment. The beamwidth and pointing direction of antenna 400 is chosen to maximally illuminate a volume of recovered service 155. The repeater provides an amplified version of the dominant donor signal(s) 110*a* at the subscriber unit and within the user area.

Referring to FIGS. 6 and 7, the donor signal gain 115 is equal to the difference in the power between amplified signal 110*a* and donor signal 110. Amplified signal 110*a* may dominate over the interference signals 112 by at least several dB at the edge of the recovered volume 155, and by typically 20 dB at 1 m. The signal gain experienced by the subscriber corresponds to the magnitude of the imbalance introduced by the repeater. Antennas 200 and 400 are co-located in the same room, generally in the same mechanical package, and also isolated electrically to allow maximum possible amplification. A back-to-back orientation, which points the lowest-amplification portions of each antennas pattern (204, 404) toward each other, creates typically 30 dB of isolation (FIG. 6). Repeater chassis 305 is metallic and provides additional electrical isolation between antennas 200 and 400. The polarization of antennas 200 and 400 may be set to 90° to acquire an additional 5-30 dB of isolation. Subscriber-side antenna 400 can be detached from chassis 305 and separated by several feet in order to increase isolation further. Additionally, techniques to electrically rotate the polarization of one antenna, with respect to the other antenna, may be employed, automatically optimized by saturation prevention circuit 380.

Antennas 200 and 400 may be separated (not mounted to a common structure) as long as the conditions for antenna and signal co-location are maintained. Co-location exists if both antennas lie within the volume of interference common to the subscriber unit, and as long as both antennas are approximately in the same plane (e.g. a generally vertical plane), such that the signal gain 115 is the same as when the antennas are physically co-located. Because donor signal strength is approximately uniform across a small area, such as a windowed room, collocating the antennas establishes a fixed signal gain, given a maximum amplification, over the donor signal that the subscriber would receive without a repeater. Co-location and limited amplification, then, create a repeater system which operates within the capacity of the system to support imbalanced downlink operation. Since the donor signals are LOS or near-LOS, downlink signal fading is modest or minimal, freeing up a reserve capacity for the system to support imbalance which can be applied to the repeater system. Additionally, uplink space diversity, provided by 2 or more base station antennas, is preserved since there is no uplink amplification between the subscriber and the donor cell. Therefore, composite uplink small-scale signal fading is minimal, whereas a conventional coverage repeater would eliminate uplink diversity, creating a downlink imbalance of its own.

When extending the invention with a second or further repeater into the interior of a building, additional path losses occur between the donor signal as received at the base-side antenna on the primary window repeater and the donor signal received at an interior subscriber location. In this case, a further imbalance, perhaps 5-10 dB, will occur, using up the limited capacity of a typical CDMA system (24 dB) to support link imbalance. Further, opposite fading, which is minor in the near-LOS (line-of-sight) environment of the windowed room, will increase, further imbalancing the links during some moments in time. Adding an uplink amplifier chain whose gain is typically 10-20 dB less than the downlink will keep the repeater system within the system's capacity for link imbalance. Because signal strengths are typically −90 to −50 dBm, a rated output power for the uplink can be as low as 0.1 mW, substantially limiting the risk of uplink interference to the cellular base station receivers, compared to conventional coverage repeaters.

Figure 10:
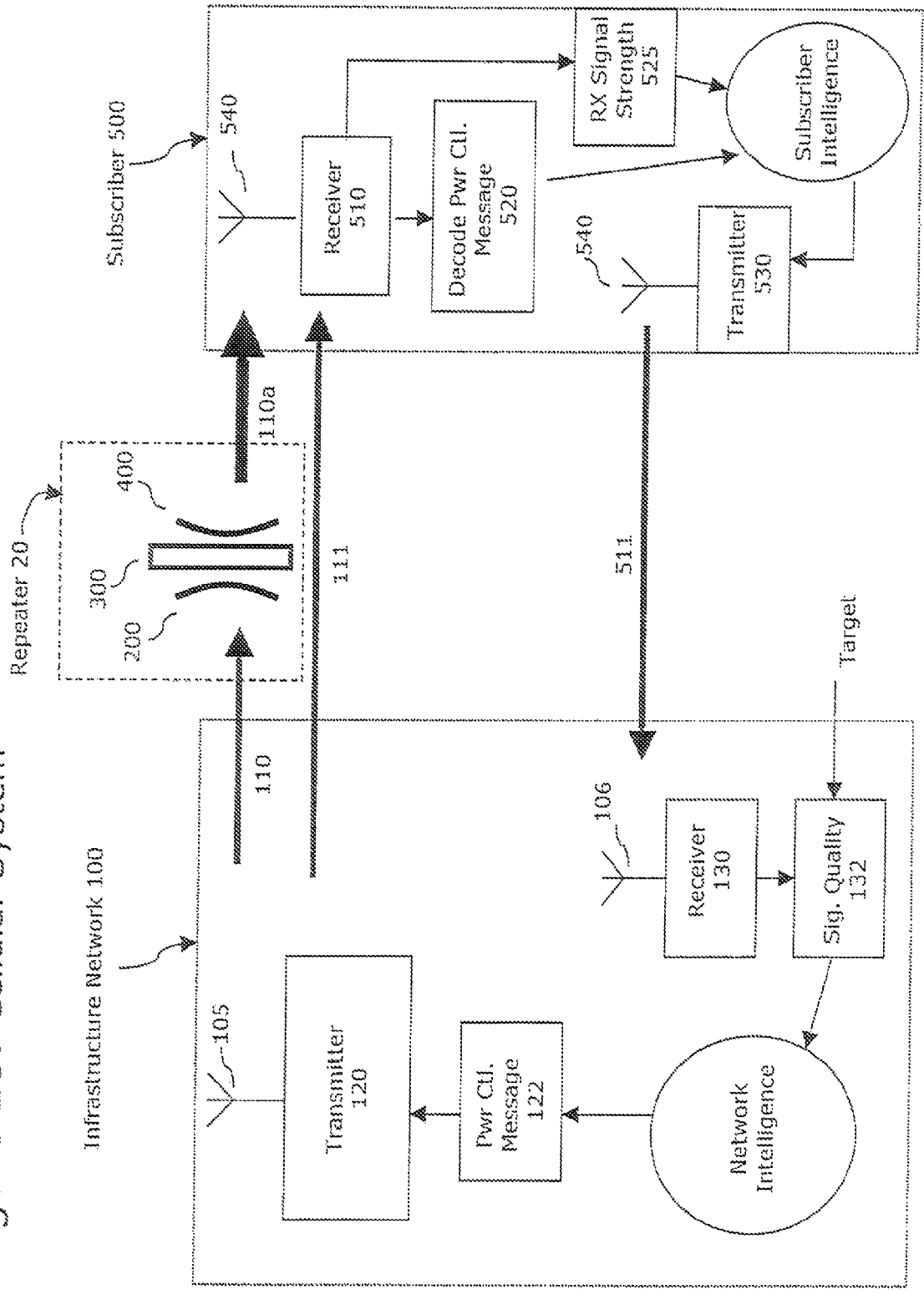
FIG. 10 is an illustration of the signals sent and received by and from a base station and a subscriber unit when the repeater system of the present invention is employed.

Referring to FIGS. 3 and 10, the power control of a subscriber call is discussed, managed mainly by the cellular network. Subscriber unit 500 receives downlink signals 110a via antenna 540 from a downlink-only repeater 20 and transmits uplink signals 511 to the network via transmitter 530 and antenna 540. Signal 110a from the selected donor cell(s) is greater in amplitude than the ambient signals 110 and 111, eliminating co-channel interference for subscriber 500.

Without the repeater, and at the start of a cellular call, network signal 111 is received by antenna 540 and then receiver 510. At an intermediate frequency of receiver 510, receive signal strength 525 is measured, which is used to determine the initial open-loop power control transmit level. A digitized message containing signal strength 525 is also relayed back to the network for subsequent tracking of subscriber behavior. Prior to subscriber transmission there is initially no subscriber signal quality to measure at network 100; so the subscriber calculates an open-loop power with which to transmit. Based on a formula which assumes a typical base station transmit power level (e.g. 5 watts) and assuming that uplink and downlink path losses are equal, the formula is "Transmit Power=−73-RSSI dBm". RSSI is the received signal strength indication 525. Subscriber transmitter 530 transmits an initial message, via antenna 540, back to network 100. Network antenna 106, receiver 130 and transmitter 120 respond by setting up a call with subscriber 500. Once a call is set up, signal quality 132 begins to assess the uplink signal quality, usually against a frame error rate (FER) target of 2-3%. At a rate of 800 times per second, closed-loop power control message 122 is sent to the subscriber on downlink 111. Power control message 122 is decoded by decoder 520, and transmitter 530 power level is adjusted up or down to keep received signal quality 132 at or near the target programmed into network 100. Thus, the second power control mechanism—closed loop power control—displaced the initial open-loop power control mechanism, and will continue to determine subscriber transmit power for the duration of the call.

Nominally, the power control setting determined by open-loop power control and the power control setting determined by closed-loop power control will be approximately the same without a repeater. Once a call is ongoing, network 100 continues to track received signal strength 525 in the event the theoretical set point for open-loop power control would deviate substantially from the closed-loop setting. This deviation might occur in the event of equipment failure, which would then precipitate a shutting down of the call in order to protect the rest of the network. The maximum allowed deviation between open-loop and closed-loop power control settings is typically 24 dB during a call and 32 dB at the start of a call, but can be programmed to be a different value by the network operator. One condition which offsets the open- and closed-loop power settings is signal fading, which occurs independently on the uplink and downlink of a frequency duplexed PCS system.

With a downlink-only repeater 20 activated, signal 110a causes the subscriber unit to report a stronger signal strength 525 than it would without a repeater, and therefore subscriber unit 500 appears to be closer to the cell site than it actually is. So upon initial call set up, the open-loop transmit power level of the subscriber is set, according to "Transmit Power=−73-RSSI (525) dBm, to a smaller power level. Since repeater signal 110a is stronger than the un-boosted donor-cell signal 111 by the signal boost (typically 5-20 dB over one to ten meters distance from the repeater), the initial subscriber transmit power will be 5-20 dB lower than without a repeater. Fortunately, the CDMA system typically allows open-loop power to be offset by 32 dB during call set up. At some level of repeater boost, call set-up will be delayed or prevented. Thus, network 100 establishes an uplink power control mechanism which is substantially independent of the downlink signal, up to a limit of 24 dB, which permits a limited link imbalance to exist for one or more subscriber units.

Referring to FIG. 7, contours of signal boost 115 decrease as the subscriber moves away from the repeater 20, until finally the difference between signals 110a and 111 approaches 0 dB, creating a smooth transition to the remainder of the indoor environment. Thus, transfer of the subscriber call (hand off) is still possible for a subscriber served by a downlink-only repeater.

As can be appreciated the present invention intentionally imbalances the downlink and uplink directions by inserting a repeater into the downlink direction. In other words, the repeater system of the present invention provides non-zero differential gain in a local area. It has been discovered that it is the downlink direction that is most affected by pilot pollution. Providing a repeater in only one direction is advantageous because it greatly reduces the cost of an individual solution to co-channel interference, eliminates the need for skilled installation, and eliminates the need for spectrum oversight and repeater monitoring for malfunction. Furthermore, the amount of signal gain is controlled to be within the mobile communication system's capability to support imbalance. Also, the repeater system may work best in areas of island coverage (e.g., where hand-offs are not needed).

Further, a secondary interior repeater can supplement the system, extending coverage into interior rooms. The secondary repeater receives the amplified downlink signal from the first repeater and amplifies it. It also receives the uplink signal from the subscriber unit, amplifies it (by a lesser amount than the downlink signal), and sends the amplified uplink signal to the base station.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A repeater in a mobile communication system comprising a plurality of base stations and subscriber units that communicate via radio frequency (RF) signals, comprising:
   a base-side antenna configured to receive at least one selected downlink signal from at least one of the plurality of base stations and destined for at least one of a plurality of subscriber units and to generate a received downlink signal, the base-side antenna also being configured to receive an amplified uplink signal and to transmit RF signals representative of the amplified uplink signal to one of the plurality of base stations;

a first amplifier, coupled to receive the received downlink signal, and further configured to amplify a level of the received downlink signal to generate an amplified downlink signal;

a second amplifier configured to receive and to amplify a received uplink signal, transmitted by at least one of the plurality of subscriber stations and destined for at least one of the plurality of base stations, by a substantially smaller level then used in a downlink direction to generate the amplified uplink signal; and a subscriber-side antenna, located proximate to the base-side antenna and coupled to the first amplifier to receive the amplified downlink signal, the subscribe-side antenna configured to transmit RF signals representative of the amplified downlink signal within a local area to nearby subscriber units, and in an uplink direction, said subscriber-side antenna being configured to receive RF signals from the nearby subscriber units and to generate the received uplink signal.

2. The repeater as defined in claim 1, wherein downlink RF signals received by the base-side antenna and downlink RF signals transmitted by the subscriber-side antenna are at substantially a same frequency, the frequency being different from a frequency of uplink RF signals received by the subscriber-side antenna and uplink RF signals transmitted by the base-side antenna.

3. The repeater as defined in claim 1, wherein each of the base-side antenna and the subscriber-side antenna comprises a pivot configured to point the base-side antenna and the subscriber-side antenna in different directions.

4. The repeater as defined in claim 1, further comprising control circuitry configured to maintain maximum gain as isolation between the base-side antenna and the subscriber-side antenna varies.

5. The repeater as defined in claim 1, wherein the second amplifier comprises:

a first filter configured to filter subscriber signals transmitted from the subscriber units;

variable gain stages configured to amplify collected uplink signals; and a duplexer configured to provide amplified uplink signals to the base-side antenna.

6. The repeater as defined in claim 1, wherein the first amplifier comprises:

a first filter configured to reject signals other than desired signals for user communications;

variable gain stages configured to amplify a filtered signal;

a detector configured to detect an amplified filtered signal; and a second filter configured to filter a signal detected by the detector and thereby supply an amplified signal to the subscriber-side antenna for transmitting to the subscriber units.

7. The repeater as defined in claim 6, wherein the variable gain stages comprise:

a first sub-amplifier configured to increase an amplitude of a received signal;

a first mixer configured to translate an amplified signal to an intermediate frequency;

an intermediate frequency stage configured to filter a translated signal to obtain a desired interference protection;

a second mixer configured to translate an intermediate frequency signal to an original frequency of the amplified signal; and a local oscillator configured to provide an un-modulated RF carrier to facilitate the first mixer and the second mixer.

8. The repeater as defined in claim 7, wherein the variable gain stages further comprise:

an attenuation stage configured to reduce the amplified signal and to keep an amplifier chain from causing excessive port output due to oscillation or excessively strong input signals.

9. The repeater as defined in claim 6, wherein the first amplifier further includes a saturation protection circuit configured to control the variable gain stages via a control voltage signal and to control an amplification indicator.

10. The repeater as defined in claim 6, wherein the first amplifier further comprises:

a second sub-amplifier configured to provide final amplification to the received signal to achieve a desired and stable amplification, wherein the second sub-amplifier is configured to supply an amplified signal to be measured by the detector to determine if output power exceeds a preset threshold approaching saturation, and wherein the second filter is configured to filter the amplified signal to prevent interference to other telecommunications users and systems.

11. The repeater as defined in claim 1, wherein the repeater is configured to substantially eliminate co-channel interference in the vicinity of the repeater.

12. The repeater as defined in claim 1, wherein the repeater is configured to substantially eliminate co-channel interference within ten meters of the repeater.

13. The repeater as defined in claim 1, wherein the subscriber units, the base-side antenna and subscriber-side antenna are located in the vicinity of each other and are in an environment to receive signals of adequate signal strength from multiple base stations.

14. The repeater as defined in claim 1, wherein the repeater system is employed in both the downlink and uplink directions and is configured to create an intentional imbalance in order to resolve co-channel interference while minimizing the risk of interference to the same communication system or to other communication systems.

15. The repeater as defined in claim 1, wherein the base-side and subscriber-side antennas are isolated from each other using cross-polarization achieved by mechanical orientation or by electrical rotation.

16. The repeater as defined in claim 1, wherein the base-side and subscriber-side antennas are isolated from each other using a metallic chassis.

17. The repeater as defined in claim 1, wherein the difference in uplink and downlink amplification is limited in magnitude to maintain the capacity of the mobile communications system to support link imbalance in a 2-way system.

18. The repeater as defined in claim 1, further including a secondary interior repeater for two-way amplification between the first repeater and the subscriber.

19. The repeater as defined in claim 1, wherein the presence of the repeater in the downlink and uplink directions causes an intentional imbalance in total losses between the downlink and the uplink, in order to provide for signal enhancement in both uplink and downlink over an equivalent coverage area.

* * * * *

UNITED STATES PATENT AND TRADEMARK OFFICE
CERTIFICATE OF CORRECTION

| | | |
|---|---|---|
| PATENT NO. | : 8,175,521 B2 | Page 1 of 1 |
| APPLICATION NO. | : 12/470590 | |
| DATED | : May 8, 2012 | |
| INVENTOR(S) | : O'Neill | |

It is certified that error appears in the above-identified patent and that said Letters Patent is hereby corrected as shown below:

On the Title Page, in Field (56), under "OTHER PUBLICATIONS", in Column 2, Line 1, delete "Piolot" and insert -- Pilot --, therefor.

In Fig. 12, Sheet 12 of 13, delete "Fig. 12:" and insert -- Figure 12: --, therefor.

In Column 3, Line 22, delete "received)" and insert -- received). --, therefor.

In Column 9, Line 37, delete "FIG. 8" and insert -- FIG. 8. --, therefor.

In Column 15, Line 43, delete "simplifier" and insert -- amplifier --, therefor.

Signed and Sealed this
Eleventh Day of September, 2012

David J. Kappos
*Director of the United States Patent and Trademark Office*